United States Patent
Megherby et al.

(10) Patent No.: US 12,373,894 B2
(45) Date of Patent: *Jul. 29, 2025

(54) VEHICLE SUPPLY CHAIN TRACKING SYSTEM

(71) Applicant: Fulpruf Technology Corporation, New Canaan, CT (US)

(72) Inventors: Richard T. Megherby, New Canaan, CT (US); Emily S. Yale, Branford, CT (US); Aleksander V. Tropp, Old Greenwich, CT (US); Michael T. McClure, Shelton, CT (US); Domenico Marco Di Donna, Naples (IT); Tyler Crain, Oakland, CA (US)

(73) Assignee: Fulpruf Technology Corporation, New Canaan, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,011

(22) Filed: Sep. 28, 2022

(65) Prior Publication Data
US 2023/0111980 A1     Apr. 13, 2023

Related U.S. Application Data

(63) Continuation of application No. 17/167,054, filed on Feb. 3, 2021, now Pat. No. 11,461,890.
(Continued)

(51) Int. Cl.
*G06T 7/00* (2017.01)
*B25J 9/16* (2006.01)
(Continued)

(52) U.S. Cl.
CPC ............ *G06Q 40/08* (2013.01); *B25J 9/1664* (2013.01); *B25J 19/023* (2013.01); *G06T 7/0008* (2013.01);
(Continued)

(58) Field of Classification Search
CPC .............. G06V 10/22; G06V 2201/07; G06V 2201/08; G06V 10/10; G06V 20/17
See application file for complete search history.

(56) References Cited

U.S. PATENT DOCUMENTS 7,436,143 B2   10/2008   Lakshmanan et al.
7,889,931 B2   2/2011    Webb et al.
(Continued)

FOREIGN PATENT DOCUMENTS

CN   205238036 U   5/2016
CN   108460972 A   8/2018
(Continued)

OTHER PUBLICATIONS

Amin et al., Quality of Obstacle Distance Measurement using Ultrasonic Sensor and Precision of Two Computer Vision-based Obstacle Detection Approaches, IEEE, 2015, p. 1-4 (Year: 2015).
(Continued)

Primary Examiner — Guillermo M Rivera-Martinez
(74) Attorney, Agent, or Firm — Farber LLC

(57) ABSTRACT

A system for capturing VIN numbers and vehicles images to track vehicle damage through vehicle supply chains which includes a mobile software application and/or robot(s) which moves autonomously around parking lots. The mobile application can direct the user to capture VIN images and/or vehicle images from certain views and collect GPS positions of the same and the robot includes various cameras and sensors to identify vehicles and take pictures of them. All of the captured images of vehicles are sent to a central server/storage where the vehicle images can be checked for damage as compared to locations so that it can be determined who was in possession of the vehicle when damage occurred.

18 Claims, 18 Drawing Sheets

Related U.S. Application Data

(60) Provisional application No. 62/970,474, filed on Feb. 5, 2020.

(51) Int. Cl.
| | |
|---|---|
| *B25J 19/02* | (2006.01) |
| *G06Q 40/08* | (2012.01) |
| *G06V 10/10* | (2022.01) |
| *G06V 20/17* | (2022.01) |
| *G06V 20/20* | (2022.01) |
| *B64U 10/60* | (2023.01) |
| *B64U 20/87* | (2023.01) |
| *B64U 50/19* | (2023.01) |
| *B64U 50/30* | (2023.01) |
| *B64U 101/30* | (2023.01) |

(52) U.S. Cl.
CPC .............. *G06T 7/001* (2013.01); *G06V 10/10* (2022.01); *G06V 20/17* (2022.01); *G06V 20/20* (2022.01); *B64U 10/60* (2023.01); *B64U 20/87* (2023.01); *B64U 50/19* (2023.01); *B64U 50/30* (2023.01); *B64U 2101/30* (2023.01); *G06T 2207/30156* (2013.01); *G06T 2207/30252* (2013.01)

(56) References Cited

U.S. PATENT DOCUMENTS

| | | | |
|---|---|---|---|
| 8,590,829 | B2 | 11/2013 | Keidar et al. |
| 10,195,629 | B1 | 2/2019 | Dahlstrom |
| 10,217,297 | B2 | 2/2019 | DeCia et al. |
| 10,268,892 | B1 | 4/2019 | Miller et al. |
| 10,373,260 | B1 | 8/2019 | Haller, Jr. et al. |
| 10,410,278 | B2 | 9/2019 | Altermatt et al. |
| 10,417,911 | B2 | 9/2019 | Herman et al. |
| 10,475,208 | B1 | 11/2019 | Morrison et al. |
| 10,607,084 | B1 | 3/2020 | Tang et al. |
| 10,643,332 | B2 | 5/2020 | Hever et al. |
| 10,650,530 | B2 | 5/2020 | Hever et al. |
| 10,703,476 | B2 | 7/2020 | Allard et al. |
| 10,773,800 | B2 | 9/2020 | Buyse et al. |
| 10,814,800 | B1 | 10/2020 | Gould |
| 10,825,097 | B1 | 11/2020 | Knuffman et al. |
| 11,301,981 | B2 | 4/2022 | Hever et al. |
| 11,303,822 | B2 | 4/2022 | Gould |
| 11,348,223 | B2 | 5/2022 | Hever et al. |
| 11,430,143 | B2 | 8/2022 | Dmitriev |
| 11,453,349 | B2 | 9/2022 | Gould |
| 11,562,472 | B2 | 1/2023 | Grossman et al. |
| 11,707,948 | B2 | 7/2023 | Shklyar et al. |
| 2004/0167682 | A1 | 8/2004 | Beck et al. |
| 2006/0004487 | A1* | 1/2006 | Sugiyama ............ B60R 25/257 235/375 |
| 2006/0114531 | A1 | 6/2006 | Webb et al. |
| 2007/0294147 | A1 | 12/2007 | Dawson et al. |
| 2009/0115609 | A1 | 5/2009 | Weaver |
| 2009/0265193 | A1 | 10/2009 | Collins et al. |
| 2010/0219297 | A1 | 9/2010 | Chesser et al. |
| 2012/0043411 | A1 | 2/2012 | Beck et al. |
| 2012/0130872 | A1 | 5/2012 | Baughman et al. |
| 2012/0297337 | A1 | 11/2012 | St. Denis et al. |
| 2013/0201354 | A1* | 8/2013 | LaScolea ............... H04N 23/80 348/207.1 |
| 2013/0233964 | A1 | 9/2013 | Woodworth et al. |
| 2013/0297353 | A1 | 11/2013 | Strange et al. |
| 2013/0329943 | A1 | 12/2013 | Christopulos et al. |
| 2014/0270385 | A1* | 9/2014 | Nepomniachtchi .... G06V 10/98 382/104 |
| 2015/0026174 | A1 | 1/2015 | Nuggehalli et al. |
| 2015/0029346 | A1* | 1/2015 | Sieger ................. H04N 23/661 348/333.03 |
| 2015/0032580 | A1 | 1/2015 | Altermatt et al. |
| 2015/0097924 | A1 | 4/2015 | Hauk |
| 2015/0103170 | A1 | 4/2015 | Nelson et al. |
| 2016/0034590 | A1 | 2/2016 | Endras et al. |
| 2016/0078759 | A1* | 3/2016 | Nerayoff ............... G08G 1/0175 701/3 |
| 2016/0129999 | A1 | 5/2016 | Mays |
| 2016/0140778 | A1 | 5/2016 | Bailly et al. |
| 2016/0173740 | A1* | 6/2016 | Corby ................... B64C 39/024 348/148 |
| 2016/0200437 | A1 | 7/2016 | Ryan et al. |
| 2016/0232411 | A1 | 8/2016 | Krishnamoorthy et al. |
| 2016/0253576 | A1 | 9/2016 | Kilpatrick |
| 2016/0318607 | A1 | 11/2016 | Desai et al. |
| 2017/0111567 | A1 | 4/2017 | Pila |
| 2017/0221229 | A1 | 8/2017 | Perrier et al. |
| 2017/0267345 | A1 | 9/2017 | Marom |
| 2017/0330460 | A1 | 11/2017 | Massey |
| 2018/0013211 | A1 | 1/2018 | Ricci |
| 2018/0029797 | A1 | 2/2018 | Hance et al. |
| 2018/0155057 | A1 | 6/2018 | Irish |
| 2018/0158039 | A1* | 6/2018 | Cox ....................... G06Q 30/06 |
| 2018/0215546 | A1* | 8/2018 | High ........................ B25J 9/06 |
| 2018/0260793 | A1* | 9/2018 | Li .......................... G06Q 40/08 |
| 2019/0031343 | A1 | 1/2019 | Russell |
| 2019/0055015 | A1 | 2/2019 | Allard et al. |
| 2019/0064836 | A1* | 2/2019 | Buttolo ...................... G06T 7/70 |
| 2019/0082149 | A1* | 3/2019 | Correnti ........... G08B 13/19613 |
| 2019/0088123 | A1* | 3/2019 | Farooq .................. B60W 30/00 |
| 2019/0102874 | A1 | 4/2019 | Goja |
| 2019/0130671 | A1 | 5/2019 | Dillow et al. |
| 2019/0147583 | A1 | 5/2019 | Stefan |
| 2019/0206005 | A1 | 7/2019 | Liu et al. |
| 2019/0266715 | A1 | 8/2019 | Myers et al. |
| 2019/0279142 | A1 | 9/2019 | Andrews |
| 2019/0295189 | A1 | 9/2019 | Strasser |
| 2019/0303982 | A1 | 10/2019 | Michel et al. |
| 2019/0318549 | A1 | 10/2019 | Zeira et al. |
| 2019/0362569 | A1 | 11/2019 | Manoria |
| 2020/0005641 | A1 | 1/2020 | Park |
| 2020/0035101 | A1 | 1/2020 | Brooks et al. |
| 2020/0082545 | A1 | 3/2020 | Wylie et al. |
| 2020/0207488 | A1 | 7/2020 | Troy et al. |
| 2021/0174117 | A1 | 6/2021 | Hever et al. |
| 2021/0241438 | A1 | 8/2021 | Megherby et al. |

FOREIGN PATENT DOCUMENTS

| | | | | |
|---|---|---|---|---|
| CN | 110245552 A | * | 9/2019 | |
| CN | 110245552 B | | 9/2019 | |
| CN | 110263615 A | * | 9/2019 | |
| EP | 3579174 A1 | | 12/2019 | |
| GB | 2552092 A | | 1/2018 | |
| WO | 2007141795 A1 | | 12/2007 | |
| WO | 2017027648 A1 | | 2/2017 | |
| WO | WO-2017197444 A1 | * | 11/2017 | ........... G06K 9/3258 |
| WO | 2019067788 A1 | | 4/2019 | |

OTHER PUBLICATIONS

Bansal et al., Vision-based Perception for Autonomous Urban Navigation, 2008, IEEE, p. 434-440 (Year: 2008).

Coia, Anthony, "Maintaining the flow", Automotive Logistics, pp. 1-5, Mar. 30, 2015.

Fitzgerald, Joseph et al., "Using autonomous robots to drive supply chain innovation", Deloitte, pp. 1-12, 2017.

International Search Report and Written Opinion of the Searching Authority dated Apr. 23, 2021 in PCT/US2021/16607.

Marcia, et al. "Behind the great automotive cover-up", Automotive Logistics, pp. 1-9, Jul. 1, 2012.

Maru et al., Obstacle detection for vehicles in intellignet transport system, IEEE, 2016, p. 431-435 (Year: 2016).

Seki et al., Robust Obstacle Detection in General Road Environment Based on Road Extraction and Pose Estimation, IEEE, 2021, p. 437-444 (Year: 2021).

Sivaraman et al., Looking at Vehicles on the Road: A Survey of Vision-Based Vehicle Detection, Tracking, and Behavior Analysis, 2013, IEEE, p. 1773-1795 (Year: 2013).

(56) References Cited

OTHER PUBLICATIONS

Unknown. "VIN Number Location.com", in VINnumberlocation.com [online], pp. 1-4, 2-4 published Mar. 3, 2019 (retrieved on Mar. 26, 2021). Retrieved from the Internet <URL: https://web.archive.org/web/20190303025312/https://www.vinnumberlocation.com/> entire document, especially p. 1. Re-retrieved Jul. 22, 2021.

Extended/Supplementary European Search Report; EP Application No. 21750121.2; Dec. 8, 2023.

\* cited by examiner

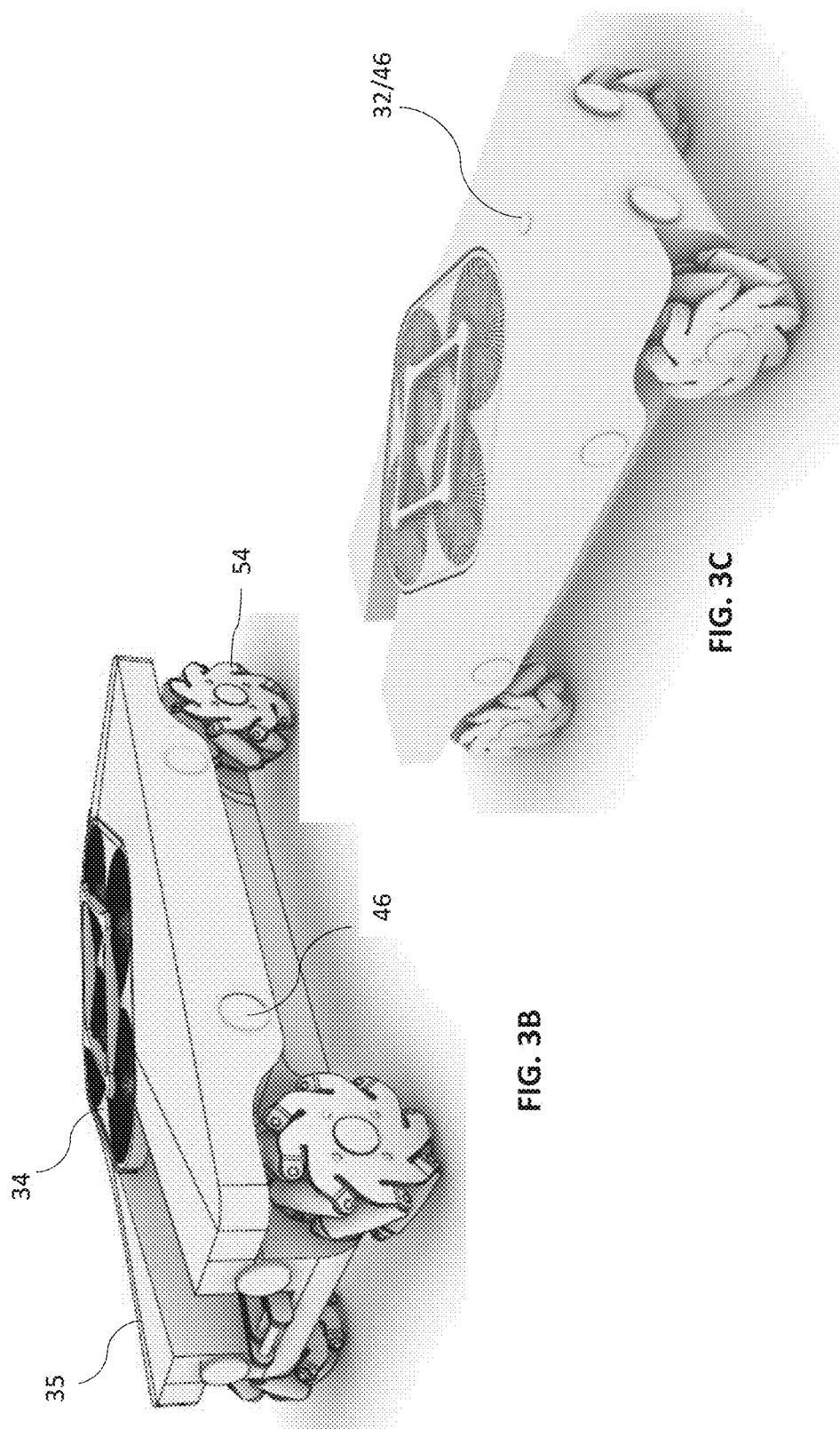

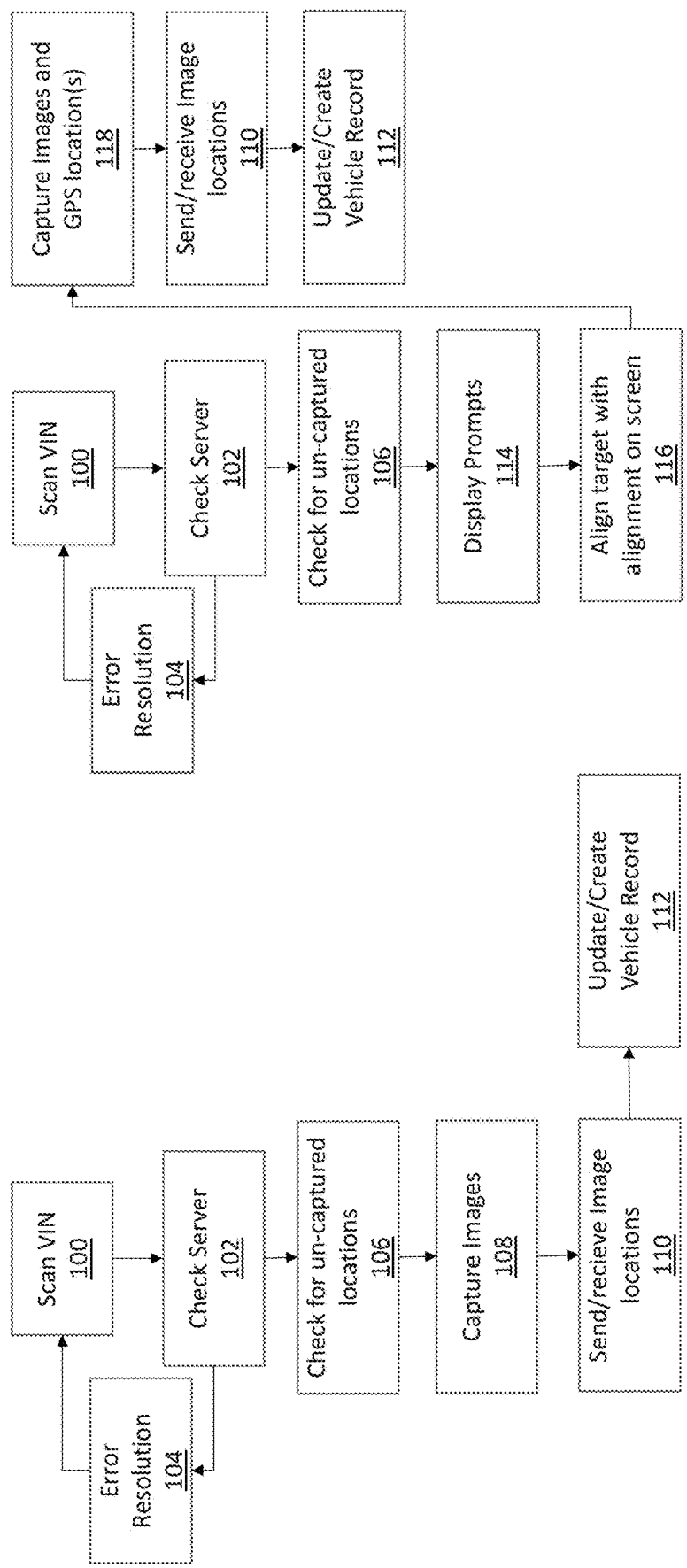

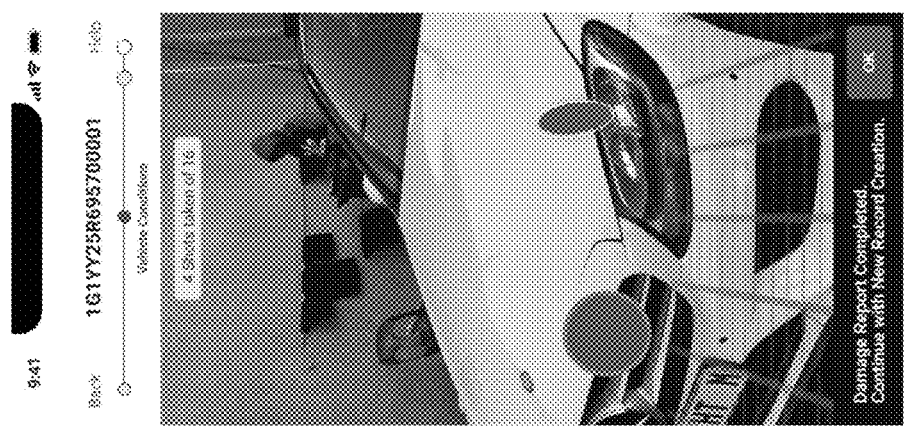
FIG. 15
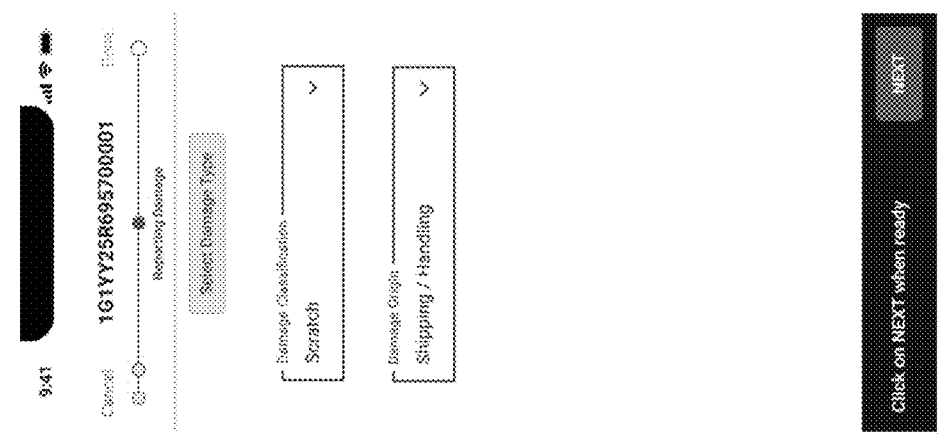
FIG. 14
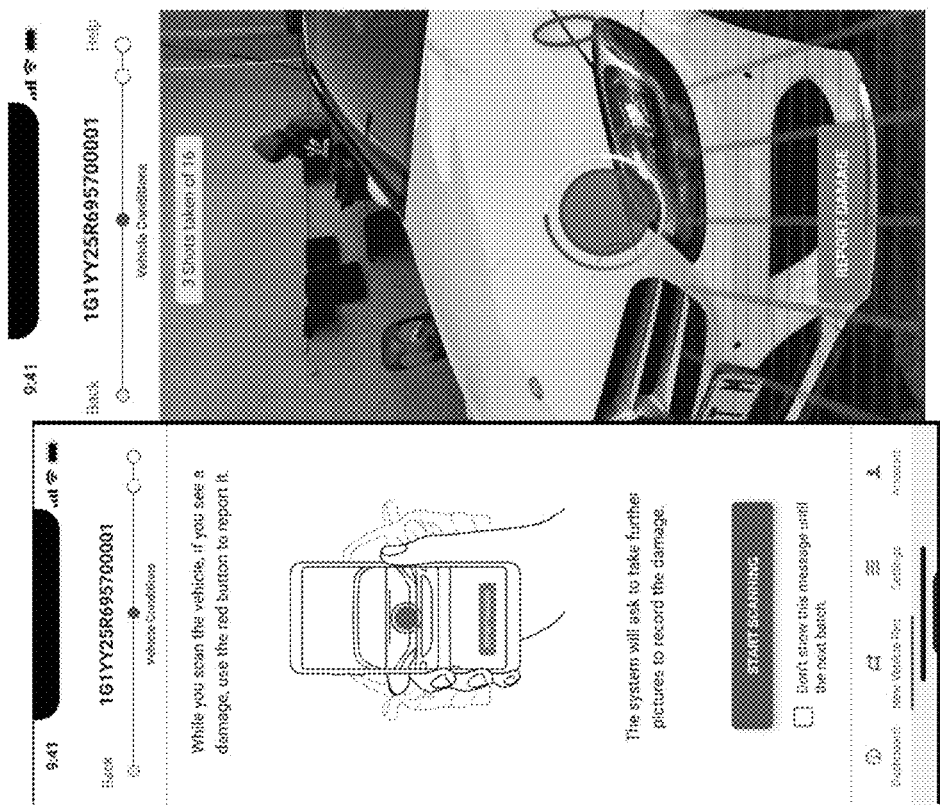
FIG. 13
FIG. 12

| ☐ | Batch ID | # Vehicles | Vehicle Handler | Last Modified Date | Status |
|---|---|---|---|---|---|
| | FCA-FX50BUK9 | 5 | Italian Cars | Yesterday, 12:34 PM | Complete |
| | MRCDS-AB87DAX7 | 10 | EuroLuxury | Today, 9:30 AM | Open |
| | VOLVO-XD12WEL4 | 7 | EuroLuxury | Today, 9:30 AM | Open |
| | MRCDS-NJ-WO76594 | 5 | American Made | Today, 9:30 AM | Open |
| | FORD-BD-WO76594 | 12 | American Made | Today, 9:30 AM | Transfer |
| | HONDA-XS-JR567 | 7 | Japan Fury | Today, 9:30 AM | Transfer |

FIG. 21

| VIN | Manufacturer | Batch ID | Last Modified Date | Vehicle Handler | Status |
|---|---|---|---|---|---|
| 1G1YY25R695700801 | Alfa Romeo | FCA-FX508UK9 | Yesterday, 12:34 PM | Italian Cars | Open |
| 2G1YY25R695700546 | Mercedes | MRCDS-AB87DAX7 | Today, 9:30 AM | EuroLuxury | Open |
| 2G1YY25R695700546 | Mercedes | MRCDS-AB87DAX7 | Today, 9:30 AM | EuroLuxury | Open |
| 2G1YY25R695700546 | Mercedes | MRCDS-AB87DAX7 | Today, 9:30 AM | EuroLuxury | Open |
| 2G1YY25R695700546 | Mercedes | MRCDS-AB87DAX7 | Today, 9:30 AM | EuroLuxury | Open |
| 2G1YY25R695700546 | Mercedes | MRCDS-AB87DAX7 | Today, 9:30 AM | EuroLuxury | Open |
| 2G1YY25R695700546 | Mercedes | MRCDS-AB87DAX7 | Today, 9:30 AM | EuroLuxury | Open |
| 1G1YY25R695700801 | Volvo | VOLVO-XD12WEL4 | Dec 11th 2019, 11:30 AM | EuroLuxury | Open |

FIG. 22

VEHICLE SUPPLY CHAIN TRACKING SYSTEM

FIELD OF THE INVENTION

The following relates to systems and methods of tracking damage in a vehicle supply chain in order to determine where/when damage is caused so that the appropriate responsible party can be determined.

BACKGROUND OF THE INVENTION

When a new vehicle is purchased off the lot it has that "new car" smell and is shiny and well, new. However, what most retail buyers of vehicles do not realize is that in the journey from the factory to the showroom floor, new vehicles are often damaged. There are allowable amounts of damage that can be done to the car for it to still be considered new, but even though this damage is allowable, it must be fixed by someone and someone then needs to cover that cost. Typically each car leaving the factory will have a number of different entities "touch" or be responsible for a given part of the journey. Because the vehicle will often change hands numerous times before it ends up at the new car dealership, when damage occurs, it is important to know when that damage occurred in the supply chain so that it is then known who was responsible for causing the damage and equally so it is known who is not responsible for damaging the car at a given time when the vehicle was under the possession of a particular company. Ultimately, an insurance company likely will be responsible for paying whomever fixes the car. But, each responsible party for the car may have different insurers or even if they have the same insurer, the insurer still wants to know who is causing damage in case a particular responsible party in the supply chain is causing damage more often than others, to the point which that party may be un-insurable without process changes or other protections or where a premium increase may be appropriate. In addition, in the current environment, the policy holder (e.g. manufacturer) will pay the insurance company a fee for each vehicle in addition to their premium for each vehicle that is to be covered during shipping. The insurance company then will pay a company who inspects the vehicles, a process with a relatively high cost. Inspections currently cost the insurance company roughly $800 per inspector on site for a given day and the quality of the inspection is often insufficient to actually pinpoint where damage occurred.

When damage to the car is identified at the new car dealership or their warehouse, without a reliable tracking system the various responsible parties will tend to say "not me" or "they did it" or simply ask for proof that the damage actually occurred when the car was under the watch of a particular entity. The end result is large amounts of wasted time trying to figure out who is responsible because the inspection process throughout the supply chain is inadequate.

Current methods of tracking damage involve human inspection of the cars with a sheet of paper showing the different vehicle panels so that damage can be marked. This is not unlike what a traditional rental car inspection form looks like. However, the problem with this human inspection is that the inspectors are given a large number of cars per hour they must inspect, roughly 200 per day. This leaves roughly 2 minutes to inspect each vehicle including paperwork necessary to document the damage.

Given the tight spacing of these cars, the human inspector is sometimes left at a disadvantage in that they cannot position themselves to get a very good vantage point to see damage, and then there is human error where damage is not noted or recognized even if the vantage point is good. This can lead to the incorrect party being identified as responsible and the wrong insurance company paying for damage their insured was not actually responsible for.

Some solutions have been contemplated such as a drive through garage/structure which has cameras to take multiple pictures of each car. But, this suffers the significant disadvantage in that it slows down the unloading process which freight companies will often provide a limited window before the driver is instructed to leave (or charge the unloading company). Thus, there are time pressures where the cars have to be taken off the train (or carrier truck or shipping vessel) in a timely and orderly fashion and a drive through garage which slows down this process is not a practical solution. Additionally, given the large amount of equipment such a drive through garage may require, it can be a significantly more expensive system which each of the many, many staging lots and locations would require installation of in order for the system to accurately capture the vehicle condition over the entire supply chain. There may also be locations where fixed infrastructure such as this drive through garage solution may be impractical due to size or footprint, thus requiring the use of human inspectors in those locations which brings back the element of human error this drive through garage was intended to eliminate.

Accordingly, a more cost effective solution is desirable which can allow for easy and repeatable image capture of good quality and at the correct angles and views to accurately and correctly capture the condition of vehicles as they move through the supply chain from factory floor to showroom floor while reducing and preferably eliminating human error. It is also desirable that this solution can work with existing staging lot configurations in the tight spaces provided.

SUMMARY OF THE INVENTION

Therefore, it is an object of the present invention to provide a vehicle damage tracking system which enables repeatable and high quality images to be taken of vehicles throughout the supply chain in different locations and then consolidated into a vehicle record. The images captured may be, e.g. still images and/or videos.

It is another object of the invention to provide a system for automated and accurate capture of VIN numbers and then corresponding vehicle photos, all associated with GPS locations.

The various stages of the supply chain will often have large lots which provide 108 inch wide spaces in which the cars are parked nose to tail with minimum spacing between—possibly in the 6-12 inch range. Each allocated vehicle space is 108"×240" (straight line parking) and vehicles range from roughly 60-80 inches wide (not including mirrors). Vehicles tend to be in the 13-16 foot length range. The end result is that there is roughly 28-48 inches between vehicles not including mirrors (which reduces available space in certain locations). Herringbone parking uses generally the same dimensions above except that the distance from the front corner of a bumper to the front corner of another vehicle may only be 1-2 inches apart. The vertical distance between the furthest front corner bumper of one vehicle to the furthest front corner bumper of the vehicle in front of it may range from 84" to 113" although this is not an exact measurement because distances may vary based on how human operators park the vehicles. In many cases, the spacing between mirrors may be left to only 14 inches for the largest vehicles in the lot which is typically 80 inches wide. Smaller vehicles are about 60 inches wide and thus provide more space in the lot. This distance is just enough for workers to get in the car to drive it in position (because the mirrors add about an additional foot of space. The worker can also get out of the car so others can be put in position in the staging lot. The distance between bumper and nose is very small—typically 6-12 inches so that inspectors cannot walk around the front bumper easily. The tight spacing is designed in order to have as many cars in a lot as possible while minimizing other risks (e.g. damage) because the inspector is typically paid per day and is expected to cover about 200 vehicles per day, however, the staging lot and associated entity is trying to pack as many cars in the available space to reduce cost and because the more cars that can be transported and staged in a particular location, the more profitable for the shipper. Accordingly, it is another object of the invention to provide a solution to enable capture of vehicle images without requiring modification to vehicle spacing and lot configuration, particularly, a robot which can move around the lot and under cars and can deploy a camera to take photos of locations with tight spacing described herein.

One of the more challenging portions of scanning vehicles involves accurately capturing the VIN. Glare, varied light conditions, reflections and weather conditions can make it difficult to automatically capture the VIN. Accordingly, it is an object of the present invention to provide a way to scan, verify and re-position and re-scan in order to capture the VIN accurately so that images of the vehicle can be associated with the correct yin.

What is further desirable is to provide a mobile application to gather vehicle images and associate them with VIN numbers and vehicle records either as a stand alone solution or as a conflict/error resolution system where certain vehicles could not be imaged and scanned properly with the robot alone and may require some manual intervention.

These and other objects are achieved by providing a cloud/web based software which communicates with one or more robots/mobile devices to receive VIN numbers and images from those robots/devices related to vehicles. More particularly, the cloud/web software receives images from these robots/devices in different locations associated with the same vehicle(s) an as these robots/devise capture images the locations of those images are recorded in order to most efficiently capture images of vehicles within a particular parking lot location.

In one aspect a system for autonomous scanning of vehicle VIN numbers is provided and includes a robot with a camera and a controller with software executing thereon which identifies a vehicle positioned in a frame of the camera. The software controls movement of the robot to position the camera in a location where a VIN number is expected to be visible from an exterior of a vehicle. The software, moves the camera to position the VIN number within a frame of the camera and captures the VIN number.

In other aspects the software identifies the vehicle positioned in the frame of the camera by recognizing at least one identifying feature of the vehicle and matches the at least one identifying feature to at least one known vehicle identifying feature from a database of known vehicle identifying features to determine the location where the VIN number is expected to be visible based on an expected VIN location associated with the known vehicle identifying features as compared with a position of the at least one identifying feature. The software moves the robot to or adjacent the location where the VIN number is expected to be visible as determined by the software.

In further aspects the database of known vehicle identifying features is on a storage on the robot. In other aspects the matching further includes selecting from known vehicle identifying features which are associated only with at least one make of vehicle within a group of a plurality of vehicles for the robot to capture a plurality of images of.

In yet further aspects the software determines if the VIN number was captured and communicates over a network with a computer having a data store, the data store containing a plurality of VIN numbers wherein the VIN number captured with the first image is matched with at least one of the plurality of VIN numbers in the data store. The software captures a plurality of images of the vehicle around a periphery of the vehicle and associates said plurality of images, in a data store, with a vehicle record associated with the VIN number.

In one aspect a system for autonomous scanning of vehicle VIN numbers includes a robot comprising a camera and a controller with software executing thereon which identifies a vehicle positioned in a frame of the camera, the software controlling movement of the robot to position the camera in a location where a VIN number is expected to be visible from an exterior of a vehicle. The software, based on images captured by the camera, moves the camera to position the VIN number within the frame of the camera. The software captures a first image and determines if the VIN number was captured and communicating over a network with a computer having a data store, the data store containing a plurality of VIN numbers wherein the VIN number captured with the first image is matched with at least one of the plurality of VIN numbers in the data store. The software, based on the matched VIN number, captures a plurality of images of the vehicle around a periphery of the vehicle and associates said plurality of images, in a data store, with a vehicle record associated with the VIN number.

In certain aspects if the software determines that the VIN number was not captured, the software identifies one or more impediments to capture of the VIN number based on the image and moves the camera to a different position to capture a new first image used for determining if the VIN number was captured.

In other aspects the software determines if the VIN number was captured by performing ocular character recognition on the image and comparing to and expected makeup of VIN numbers to determine if the VIN number captures is complete prior to matching the captured VIN number to the at least one of the plurality of VIN numbers in the data store.

In other aspects the software directs the robot to capture the plurality of images for a plurality of the vehicles within a defined geographical space. The robot includes a global positioning system (GPS) receiver and the captured VIN number and/or the images are associated with one or more locations based on the GPS receiver. And, the software positions the robot to a next position based on identifying a next vehicle of the plurality of vehicles such that a location of the next vehicle is a different location than all previous locations of the captured VIN numbers and/or the images.

In other aspects the robot receives instructions via the network which identify previous locations that other robots have captured VIN numbers and/or the images at. In still other aspects, the robot captures images of more than one of the plurality of vehicles at one or more of the one or more locations and associates those images with different ones of the captured VIN numbers. In yet other aspects, the electrical connection is further associated with a semi rigid support structure comprising a plurality of linkages which fold and unfold from within the first body. In still other aspects, the camera is mounted on a gimbal on a drone which is tethered to the portion of the robot which includes a source of electrical potential which powers the drone.

In certain aspects, the robot includes a drone tethered to a first body of the robot and the first body includes a cradle wider than the drone such that a maximum width of the drone is less than a width of the first body, the width of the drone and first body measured perpendicular to an axis of rotation of one or more propellers of the drone when positioned in the cradle.

In yet other aspects the robot includes a first body comprising one or more motors which are configured to propel the body over a surface and a source of stored electrical potential and a second body comprising a camera and one or more air thrusters which are configured to propel the second body in air. An electrical connection between the first and second body such that the source of electrical potential powers the one or more air thrusters via the electrical connection. The second body is configured to be mounted on the first body in a first configuration having a maximum height over the surface less than 12 inches. The electrical connection is configured to extend to at least three times the maximum height over the ground and optionally less than 12 times the height over the ground, preferably, the vehicle images are all captured from a height less than 12 times the height over the ground. A maximum combined thrust of the one or more air thrusters is half or less than a weight of the robot. The software executing on the controller controls movement of the one or more motors and activation of the one or more thrusters and image capture by the camera to position the first body so that the second body can be moved apart from the first body by the air thrusters in order to capture the plurality of images of each of the plurality of vehicles and to capture the VIN number of each vehicle. A network connection device on the first body is configured to transmit the plurality of images taken by the camera to a remote computer via a network, the plurality of images each associated with the vehicle record based on the VIN number further associated with a location as determined by a global positioning system (GPS) receiver of the robot.

In certain aspects the robot further comprises at least one camera on the first body and at least one proximity sensor on the first body.

In yet other aspects, the source of stored electrical potential is at least 1.5 times the weight of the second body not including the electrical connection to the first body.

In still other aspects, the robot comprises a plurality of robots and the system further comprising: for each robot, said commands generated by the software based on identifying one of the plurality of vehicles in proximity to each robot and said commands determined based on a location of that one of the plurality of vehicles as compared to previous locations of others of the plurality of vehicles for which images have already been captured by that robot and said commands further based on data received via the networking hardware indicating locations of others of the plurality of the vehicles that others of the plurality of robots have already captured images of such that the commands direct each robot to a location that the robot and others of the plurality of robots have not yet captured.

In still other aspects at least one of the previous locations is associated with a heading indicative of a direction in which the camera was pointed to capture an image associated with that previous location, the heading determined by a direction indicated by a heading reference system on the robot as compared to a position of the camera in rotation relative to that heading.

Still other objects are achieved by providing an autonomous image capture robot which includes first body comprising one or more motors which are configured to propel the body over a surface and a source of stored electrical potential and a second body comprising the camera and one or more air thrusters which are configured to propel the second body in air. An electrical connection is between the first and second body such that the source of electrical potential powers the one or more air thrusters via the electrical connection. The second body is configured to be mounted on the first body in a first configuration having a maximum height over the surface less than 12 inches. The electrical connection is configured to extend to at least three times the maximum height over the ground and preferably images are taken at less than 12 times the height over the ground. A maximum combined thrust of the one or more air thrusters is half or less than a weight of the robot. The software executing on the controller controls movement of the one or more motors and activation of the one or more thrusters and image capture by the camera to position the first body so that the second body can be moved apart from the first body by the air thrusters in order to capture a plurality of images of each of a plurality of vehicles and to capture a VIN number of each vehicle. A network connection device on the first body is configured to transmit images taken by the camera to a remote computer via a network, the images each associated with a VIN number and a location as determined by a global positioning system of the robot.

In certain aspects, the source of stored electrical potential is at least 1.5 times the weight of the second body not including the electrical connection to the first body. A heading reference system is on the second body which is configured to measure a magnetic heading. The camera on the second body rotates about an axis and each of the images further associated with a heading determined by a comparison of the magnetic heading to a rotational position of the camera about the axis, the heading indicative of a direction in which the camera was pointed when capturing each of the images.

In certain aspects the network connection device allows two robots to communicate with each other to transmit and receive VIN numbers captured and locations of images captured.

Other objects are achieved by providing a system of autonomous capture of images of a plurality of vehicles including a plurality of robots each having: one or more motors to move the robot over a surface, a camera, a controller with software executing thereon, networking hardware for communication over a network and a global positioning system (GPS) receiver. The controller controls movement via the one or more motors based on commands from the software. For each robot, the commands are generated by the software based on identifying one of the plurality of vehicles in proximity to each robot and said commands are determined based on a location of that one of the plurality of vehicles as compared to previous locations of others of the plurality of vehicles for which images have already been captured by that robot and said commands further based on data received via the networking hardware indicating locations of others of the plurality of the vehicles that others of the plurality of robots have already captured images of such that the commands direct each robot to a location that the robot and others of the plurality of robots have not yet captured.

In still other aspects a system for vehicle supply chain tracking through image capture of vehicles is provided with a system computer having software executing thereon, the system computer configured to receive image and location data from a plurality of mobile devices comprising a first and a second mobile device each having software executing thereon, the mobile device further comprising a camera and a global positioning system (GPS) receiver. The software of the system computer is configured to receive from the first mobile device, as captured with said camera and software of said first mobile device, a VIN number for a first vehicle at a first location as determined by the GPS receiver of the first mobile device and the software further configured to receive a first set of a plurality of images of the first vehicle captured by the first mobile device and to further associate each of said first set of the plurality of images with the VIN number in a vehicle record of the first vehicle, the first set of the plurality of images stored in a storage accessible by said system computer. The software of the system computer is further configured to receive from the second mobile device, as captured with said camera and software of said second mobile device, the VIN number for the first vehicle at a second location which is a different location of the first vehicle in that the first vehicle has been moved relative to the first location, the second location determined by the GPS receiver of the second mobile device and the software further configured to receive a second set of a plurality of images of the first vehicle captured by the second mobile device and to further associate each of said second set of the plurality of images with the VIN number in the vehicle record of the first vehicle and the second set of the plurality of images stored in the storage. In certain aspects, the plurality of mobile devices are a robot with a ground movement device configured to move the robot over a ground surface.

In one aspect the robot further includes at least one thruster configured to move a portion of the robot through air to position the camera of the robot to take the plurality of images of the first vehicle. In another aspect the plurality of mobile devices are a computing device selected from the group consisting of a mobile phone, tablet, laptop or another mobile device including a display, camera, processor and user input device. In certain aspects the software executing on the computing device displays one or more prompts for capture of the VIN number and the first and second sets of the plurality of images. In other aspects, the one or more prompts displayed after capture of the VIN number include a target displayed on a screen of each computing device, the target positioned and sized based on the software of the computing device identifying the first vehicle via the camera and determining a position of the camera relative to the vehicle and based on pre-determined views of the first vehicle. In still other aspects said screen displays an alignment target and when the target and alignment target align an image of the first or second sets of the plurality of images is captured by the software of the computing device.

In other aspects, the software of the first and/or second mobile devices is configured to receive an indication of damage corresponding with one or more images of the first and/or second set of the plurality of images and to associate said indication of damage with the corresponding image.

In certain aspects, the first and second locations are further associated with different responsible entities. In other aspects a portal is provided with said software of said system computer to allow access to the vehicle record and the vehicle record indicates the different responsible entities.

In still other aspects, the first and second mobile devices each comprise multiple mobile devices and the first vehicle comprises a plurality of vehicles each with its own associated vehicle record stored in the storage.

In other aspects, the software of the first and second mobile devices captures the VIN number with the camera of that mobile device by scanning using barcode scanning or ocular character recognition and based on a string of letters and/or numbers determined by the scanning, checking if the string matches an expected VIN number pattern and if scanning fails or the string does not match, the software of the corresponding mobile device generates control instructions to re-position the camera.

Other objects are achieved by providing a system for image capture of vehicles including a system computer having software executing thereon and a mobile computing device configured to communicate with the system computer over a network and the mobile computing device having a camera, a display and mobile software executing thereon, the mobile software configured to receive a VIN number for at least a first vehicle. The software of the mobile computing device configured to display one or more prompts, the prompts include a plurality of targets displayed on the screen, each target positioned and sized based on the mobile software identifying the first vehicle via the camera and determining a position of the camera relative to the vehicle and based on pre-determined views of the first vehicle. Upon alignment of one of the targets with an alignment target displayed on the display, the mobile software captures an image of the vehicle with the camera and the alignment target is in a fixed position on the display while each of the targets moves on the display upon movement of the mobile device around to the vehicle.

In some aspects the mobile software captures a plurality of images, each image associated with one of the plurality of targets and transmits the plurality of images over the network to the system computer where a vehicle record associated with the VIN number is associated with the plurality of images. In other aspects, each of the plurality of images is associated with a location as determined by a GPS receiver of the mobile computing device. In still other aspects, the mobile software displays one or more prompts for capture of the VIN number via the camera. In yet other aspects, the mobile computing device comprises a plurality of mobile computing devices and wherein the software is configured to receive first and second sets of images from different ones of the plurality of mobile computing devices and to associate the first and second sets of images with the same vehicle record based on the VIN number.

In still other aspects, the first and second sets of images are associated with different locations indicative of the same vehicle having been at two different locations. In yet other aspects, each of the plurality of mobile devices is associated with a GPS receiver and the two different locations are determined based on the GPS receiver. In still other aspects the first and second sets of images are a plurality of first sets of images and a plurality of second sets of images, each set of the plurality of first sets of images associated with a different VIN number and vehicle record. In other aspects, determining a position of the camera relative to the vehicle includes identifying at least two points on the vehicle and determining a distance and angle of the camera relative to the vehicle.

In still other aspects a system for vehicle supply chain tracking through image capture of vehicles is provided including a system computer having software executing thereon, said system computer in communication with one or more mobile devices and one or more robots via one or more networks, each mobile device and each robot including a camera and a GPS receiver. The software is configured to receive a plurality of VIN numbers from the one or more mobile devices, at least two of the VIN numbers captured by the camera operated by a mobile application executing on the software, the VIN numbers each associated with a GPS location. The software is further configured to transmit instructions to the one or more robots to direct at least one of the one or more robots to each of a plurality of the GPS locations such that the at least one of the one or more robots moves to or adjacent to the GPS location and captures a plurality of images of a vehicle associated with the VIN number at or adjacent its corresponding GPS location.

Other objects of the invention and its particular features and advantages will become more apparent from consideration of the following drawings and accompanying detailed description.

BRIEF DESCRIPTION OF THE DRAWINGS

FIGS. 3B and 3C are front and rear perspective views of the robot of FIGS. 1-3A

FIGS. 4-5, 6A-B, 7A-B are flow diagram according to certain features of the system of FIG. 1.

FIGS. 8-18 are screenshots of the mobile application according to the system in FIG. 1

FIGS. 21-22 show selectable vehicle records generated by the system of FIG. 1.

DETAILED DESCRIPTION OF THE INVENTION

Figure 1:
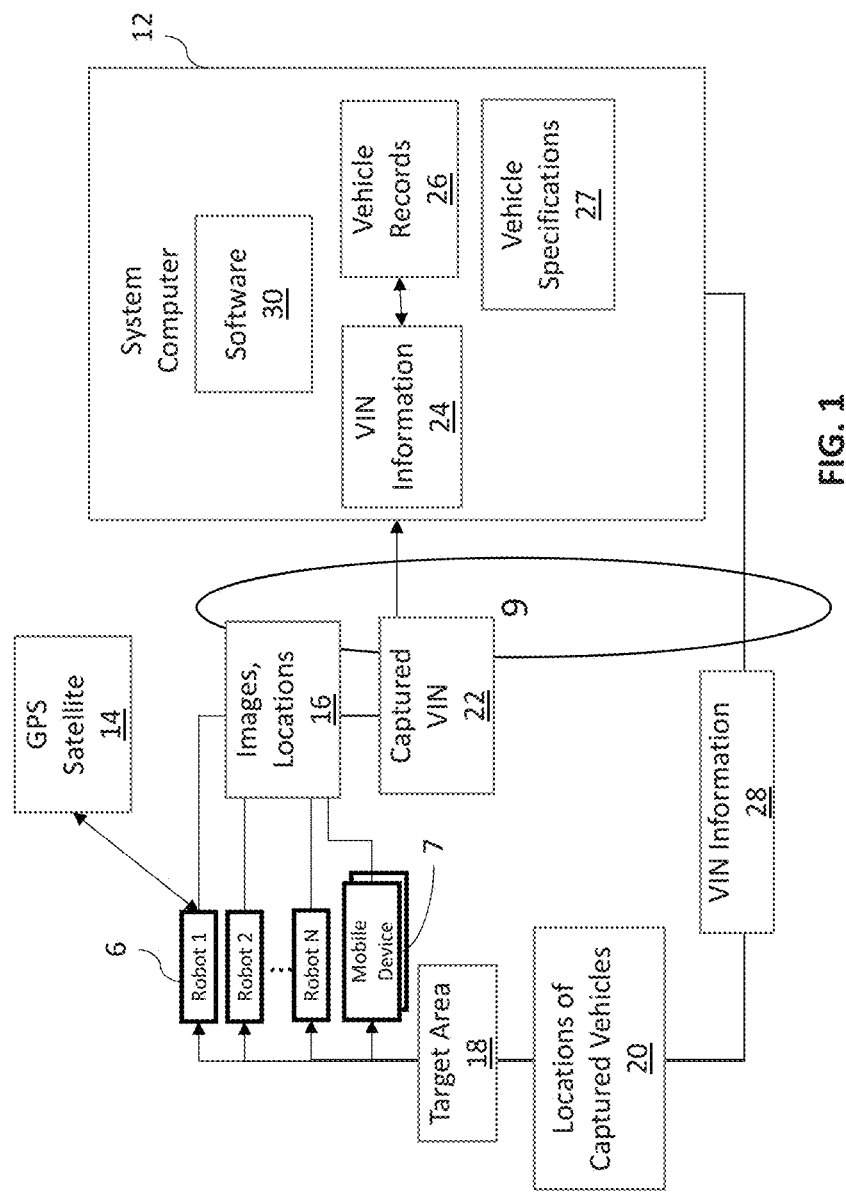
FIG. 1 is a functional flow diagram according to the present invention.

Referring now to the drawings, wherein like reference numerals designate corresponding structure throughout the views. The following examples are presented to further illustrate and explain the present invention and should not be taken as limiting in any regard.

Figure 2:
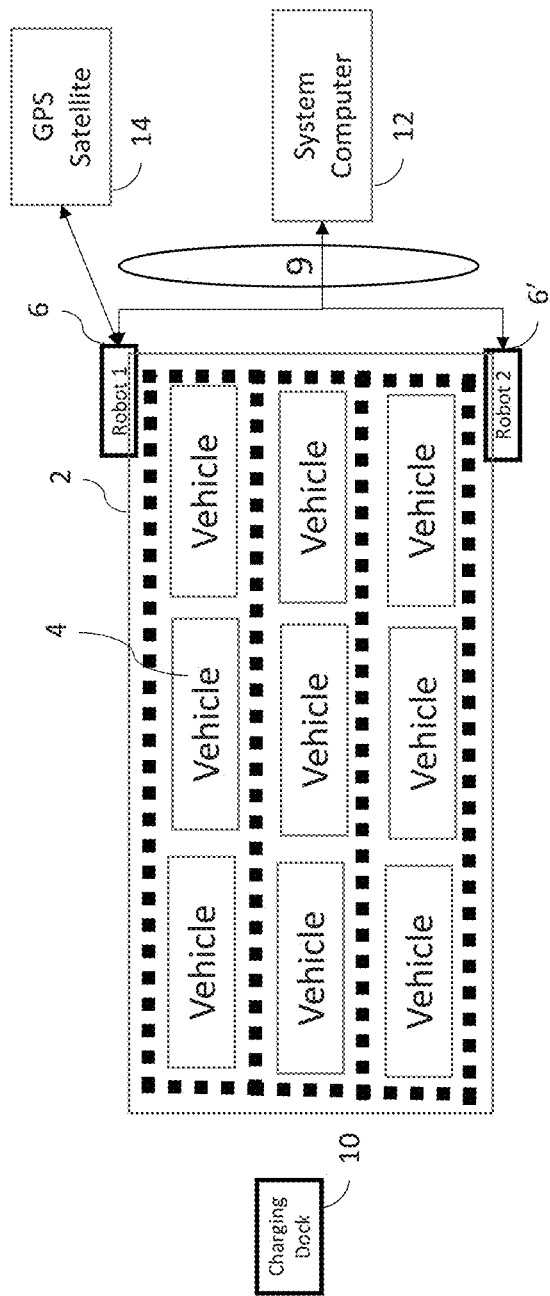
FIG. 2 is a top view of the system shown in FIG. 1 implemented in a parking lot.

Referring to FIGS. 1-2, details on the system architecture are shown. The system computer 12 includes software 30 executing thereon which provides a portal for viewing, creating or modifying vehicle records 26. Specifically, vehicle records 26 will be associated with VIN numbers and a number of photographs of those corresponding vehicles as images are taken. Initially, batches of VIN numbers may be added to the system to identify new cars which are entering the supply chain. This may be e.g. from the factory or from a shipping port where vehicles are offloaded. VIN information 24 may be used to pre-populate details on the vehicle. For example, the VIN number can identify the make, model, manufacture date, color and other features of the vehicle just from the number itself. Thus, the vehicle records 26 may indicate this information before photographs are added from the robots 6 and/or the mobile device(s) 7. The both the robots 6 and the mobile device 7 will preferably include GPS systems such as appropriate processor(s) and antenna(s) and receiver(s) to communicate with the GPS satellite network 14. The system computer 12 will instruct the robots 6/mobile devices 7 where the target area 18 is. This target area 18 may be the boundary 2 of a vehicle lot with a number of vehicles therein. With this target area 18, the robots will move from the charging dock 10 and into this boundary 2 in order to begin identifying vehicles. As a vehicle is identified by the various sensors/cameras on the robot, the robot will attempt to capture the VIN number. In the preferred embodiment, this will include releasing a UAV near bottom of the drivers side windshield which is typically the expected location where the VIN number will be visible. This captured VIN 22 is sent to the system computer along with images and locations 16. The location may be embedded in a geo referenced image. The VIN information 28 has also been provided to the robots 6 and/or mobile devices 7 of those images and is preferably kept in a storage on the robot. With this VIN information 28, as a VIN is captured 22 and images and locations 16 sent to the system computer 12, that vehicle is no longer on the list of VIN numbers that need to be captured. The VIN information 28 will typically be a list of VINs which are expected to be in the target area 18. The VIN information may also include, make, model, type of vehicle, color or other features. Thus, as the robot captures images, when a VIN number indicating a red car turns out to be e.g. black, this can indicate that there is a problem in that e.g. the VIN number was scanned wrong or there is some other issue that may require manual inspection. This location can be flagged and sent to the mobile device 7 for human inspection. As the various robots moving around the lot 2 capture VIN numbers and images the location of those already captured vehicles 20 are sent to other robots. As shown, this information is sent from the system computer 12 back to the robots. But, it is also contemplated that the robots may be capable of communicating locally between themselves with appropriate shorter distance networking hardware, e.g. Bluetooth or others. In this manner, each robot will know as vehicles in the VIN information 28 list are captured and imaged so that those robots will know where not to go in the lot. Each robot would also know the previous locations of other robots so that the robots more efficiently capture all vehicle images. The network 9 as shown may e.g. be a cellular network such as 3G, 4G, 5G or other telecommunications networks. In other embodiments, the robots communicate locally concerning locations and captured VIN numbers as they travel around the lot 2 to capture images. Once back to the charging dock 10 where there may be a WiFi connection, the robots may send images via the network 9 to the system computer 12 which stores the images with their associated VIN numbers and locations in the vehicle records 26. However, as the robots 6 move around the lot 2, the captured VIN numbers and locations of those vehicles are sent to others of the robots.

The system computer can also contain a storage including vehicle specifications 27. These vehicle specifications can include a number of different vehicle identifying features such as wheelbase, width, height, shapes of lights, bumper, window/windshield sizes. These specifications will further associate coordinates or measurements of where the VIN plate is located relative to these known identifying features as further described with respect to FIG. 6B.

Referring specifically to FIG. 2, one robot 6 is on the upper side of the lot 2 and a second robot 8 is on the lower side of the lot. Typically, the robots will follow pathways shown in dotted lines. Typically, the target area 18 will also include an indication of the parking configuration of the lot such as bumper to bumper as shown in FIG. 2 or herringbone as shown in other figures or another configuration. In this manner, the robots will have a basic understanding of the patterns and vehicle location layouts that can be expected. As shown, the robots can communicate with themselves and also via the network 9 with the system computer 12. Alternately, the charging dock 10 may operate as a WiFi hub which also communicates with the system computer. In the example shown in FIG. 2, the front of the vehicles can be facing towards the side of the system computer shown in the drawings. The first robot 6 would then capture the VIN number on the drivers side windshield and capture images of the vehicle along the drivers side. When the robot reaches the rear of the vehicle, the ground unit can remain positioned along the dotted line whereas the UAV component can move into the space between vehicle bumpers and take additional photos as needed. At this point, the locations of the images of the first vehicle can be noted with the robot expecting to later return to e.g. the passenger's side bumper to resume taking photos of the rest of the vehicle. In this manner, the robot can continue to the next vehicle in the line, capture the VIN number and the front, drivers side and rear of the vehicle and continue until the end of the row of cars. At this point, the robot would then move along the drivers side path taking images of those cars it already has VIN numbers scanned for and additionally capturing the next row of VIN numbers and images. Based on the direction (e.g. heading) that the UAV camera points and locations of already captured images of known VIN numbers, the software on the robot can determine where to pick back up adding to a particular vehicle record or where a new not yet scanned vehicle is located. Thus, for the second row of vehicles, the UAV may begin taking photos from the rear bumper towards the front and the ultimately scan the VIN number and associate those previous images with that scanned VIN number. The robot 6 continues to move around the lot and also communicates with robot 6' about locations of vehicles where images have already been captured. It is also possible that the two robots can coordinate in that the first robot can take images of one side of the middle vehicle row with the second robot taking images of the other side of that row. Given that the location the first robots images were taken are known, the second robot can then know the locations that other images need to be captured in order to e.g. get the passenger side panels imaged. Then, the VIN number scanned by the first robot can be associated with images taken by the second robot.

Figure 3A:
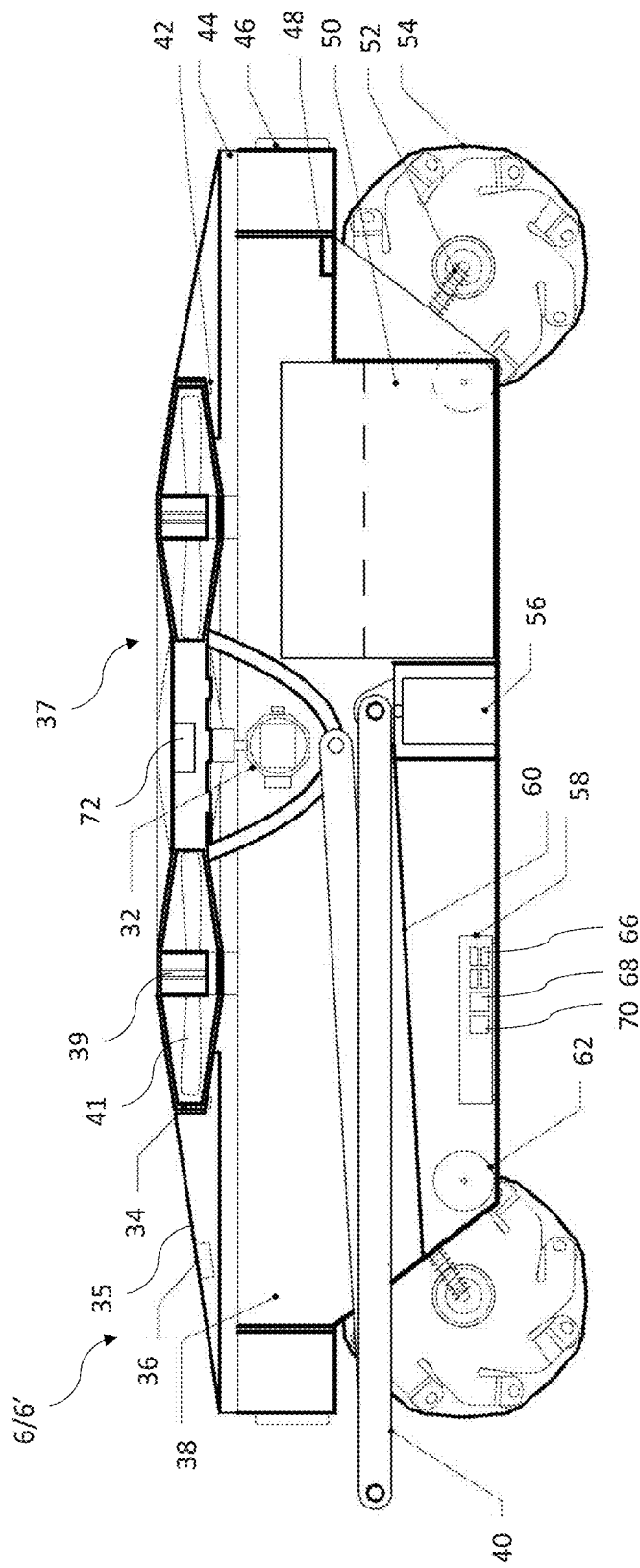
FIG. 3A is a side cutaway view of the robot of FIG. 1-2.
Figure 3F:
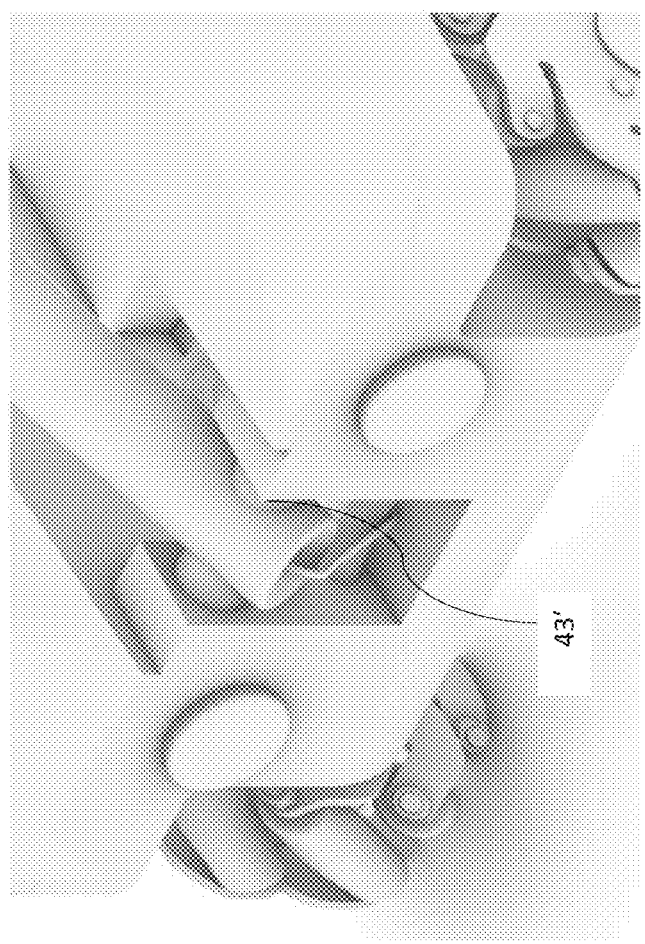
FIG. 3F is a detail perspective view of the robot of FIG. 3E.

FIG. 3A-C shows an exemplary robot according to the present invention. The first body 35 moves along the ground and the second body 34 or the UAV (unmanned aerial vehicle) rests in a cavity 37 of the first body 35. That cavity includes magnets 42 which assist in guiding the UAV into position when landing as well as holding the UAV in position. The UAV as shown has motors 39 and propellers 41, preferably four of each. The combined thrust of the propellers 41/motors 39 is great enough to overcome the magnetic force of the registration magnets 42 but not enough to lift the first body 35. The UAV also includes a gimble 32' mounted camera 32 to take pictures of vehicles so that the condition and any damage can be documented and tracked. This camera 32 may be capable of capturing both visible light spectrums and non-visible spectrums. For example, Infrared capabilities of the camera 32 may be useful in certain light conditions or may be useful in identifying vehicles/parts of vehicles and may also include a polarized lens or a filter on the lens. All cameras described herein may optionally have these features.

The first body 35 also includes cameras such as camera 36 which can be used to take pictures of the undercarriage of vehicles as the total height of the robot is designed to be less than the undercarriage clearance of typical vehicles that will be photographed. The UAV is tethered to the first body 35 by arm 40 which is shown as a plurality of bars with pivots on either end. The bars create a semi-rigid tether which, for example, will resist crosswinds in that the bars will add rigidity when extended as compared to a simple wire/cable tether. However, it is also contemplated that wire/cable tethers can be used. In either case, the tether provides for an electrical connection between the UAV 34 and the ground component 35. The semi rigid arm 40 includes a pivot 56 which allows the arm to rotate about the vertical axis when the UAV rotates. This pivot may be passive (e.g. just a bearing or other hinge/pivot that allows free rotation) or may be active in that it could use a motor which coordinates rotation of the UAV and the pivot 56.

The ability for the arm 40 to rotate about the vertical axis allows for the UAV to position itself in a manner that the direction of added rigidity is aligned with winds. For example, if the UAV were extended vertically from the position shown in FIG. 3A-C, the arm 40 would add rigidity in the direction in/out of the page, i.e. about an axis normal to at least one of the pin axes of pins which are located on either end of the bars which make up the arm 40. Thus, the UAV and/or the pivot 56 can be rotated so that the direction of rigidity is perpendicular to the winds experienced by the UAV. As shown, the first body 35 has a space/passage 38 that allows the arm 40 to extend in/out of.

The first body also has a passageway 44 therein to allow air thrust by the propellers 41 to exit the vehicle to provide venting for the UAV. Proximity sensors 46 are located on the vehicle, preferably the front and back and sides. A charging terminal 48 is provided to that the battery 50 can be re-charged. In preferred embodiments, this charging terminal 48 is connectable to a dock such that the vehicle can drive itself into the charging dock and re-charge when it is determined that the battery is low. Motors 62 move omni-directional wheels 54 and suspension 52 allows the vehicle to better move over rough terrain. Specifically, the motors 62 can allow the wheels to rotate about their axis to move forward and can also activate the secondary rollers found around the outer circumference of the main wheel to cause side to side movement of the robot or part thereof. Regular wheels can also be used as can tracks or other ground based movement systems that would be apparent to those of skill in the art. Processors 58 include controller hardware/processors 70, networking hardware/processors 68, GPS systems (e.g. a GPS chip/receiver 66) and the vehicle is also provided with appropriate hardware to control and/or gather data from the motors 62, cameras 36/32, proximity sensors 46, UAV 34, pivot 56 and other features of the robot. In preferred embodiments, the processors 58 include software executing thereon which will cause the robot to travel around the defined area 2 to capture images of vehicles 4. More particularly, as the robot travels around the area 2 (which may be a lot of a variety of different shapes and sizes), VIN numbers will be captured by the robot which will navigate using proximity sensors 46 and cameras 36/32 to identify vehicles 4 and then move to capture the VIN number. Preferably, the processors 58 and motors 62 are contained in one or more water-resistant or waterproof compartments 60.

To capture the VIN number, the UAV 34 will be deployed, typically by the processor 58 commanding the motors 39 to spin up with those commands being delivered via the tether which includes an electrical connection. Preferably, the battery 50 will power both the UAV and the ground unit, thus increasing the capacity for the UAV to take photos for a longer period of time since the UAV does not need to be large enough to lift its energy source. More specifically, in some preferred embodiments, the battery 50 powering the UAV is the same weight or is heavier than the UAV itself not including the tether or more preferably the battery is heavier than the UAV and its tether combined up to where the tether connects to the first body 35 whether electrically or mechanically. Preferably the battery is at least 1.25 times the weight of the UAV, even more preferably at least 1.5 times and even more preferably at least 2 times and most preferably 2.5 times or more the weight of the UAV. In preferred embodiments, the weight of the robot including the UAV and battery is less than 60 lbs, more particularly 50 pounds or less and even more particularly, 45 pounds or less.

The UAV may also include an ADAHARS 72 (Air Data, Attitude and Heading Reference System) which may include pitot tubes to determine wind speeds and direction along with attitude systems (e.g. digital gyros) and heading systems. In this manner, the heading of the camera lens/view can be determined. The ADAHARS may include a magnetometer which can be calibrated to know a specific heading which can then be referenced to the camera on the UAV. By knowing that a camera is e.g. pointed north and is taking pictures of a vehicle side panel and then taking pictures of another vehicle side panel when pointed south from the same position, the location of the two images may be the same, but the heading of the image can be used to resolve that two different vehicles have been captured in the same location, just different directions of view. Specifically, the camera 32 is mounted on a gimbal which allows rotation around a vertical axis as shown in FIG. 3A as well as around a horizontal axis (which itself can rotate). Based on the position of the camera lens and the gimbal position the camera angle relative to the UAV can be determined. The ADAHARS 72 will know the heading, e.g. if the front is pointing north and the camera is 90 degrees to the left around the vertical axis of the gimbal, the computer of the robot then knows the camera is taking a photo facing west, but if the horizontal axis gimbal is rotated 180 degrees, the camera is then taking photos to the east (potentially upside down). Accordingly, by knowing the gimbal position combined with the ADAHARS 72 data and more specifically the heading or other directional data, the robot can distinguish between taking photos two different cars. By combining this information with GPS position, if the camera takes phots between two cars, the 180 degree rotation of the horizontal gimbal axis described above would indicate two different cars and thus would need to be associated with two different VIN records, possibly with a different robot having taken the image/captured the VIN for one car whereas the robot taking the photo may have obtained the VIN of the other car. This allows one robot to travel down a row of cars, taking photos of the left and right sides of that aisle and based on the GPS position of each photo, the software on the server can match those positions to images taken of the vehicle but already associated with the VIN number since those images were known to be associated with a particular VIN number after scanning of that VIN.

The UAV portion is designed to fly in winds up to 20 mph which is about ⅔ the maximum speed the UAV is capable of flying. The combined robot (including the UAV) weighs 50 pounds or less and has battery capacity sufficient for 8 hours of battery life, preferably 10 hours of battery life.

Figure 3D:
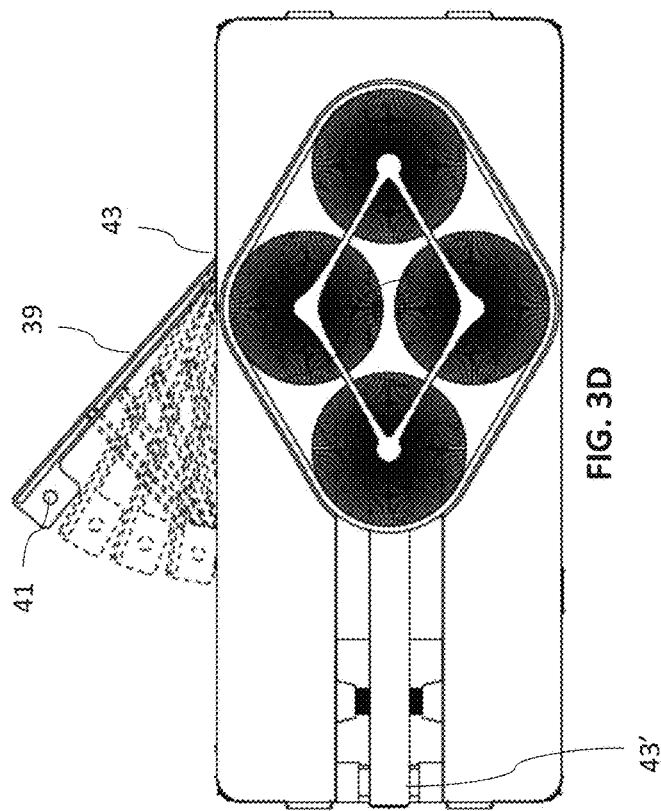
FIG. 3D is a top view of a robot showing an undercarriage camera.

Referring specifically to FIGS. 3B and 3C, additional proximity sensors 46 are shown on the sides and front/rear of the vehicle. Preferably at least one proximity sensor on each side. In some embodiments there may be two different types of sensors, for example radar/lidar/infrared and a camera. The top of the robot on the first body 35 includes a camera 32 and/or a proximity sensor 46. Preferably, at least the camera is included so that the robot can travel under the vehicle whose images are being captured to get undercarriage photographs. FIG. 3D shows an additional camera 41 which can move in/out of the body and points generally up in order to capture images of the undercarriage of the vehicle. This camera 41 may retract via an arm 39 mounted on a pivot 43 and activated by a motor within the robot body. This is but one retraction mechanism that can be utilized for this undercarriage camera 41.

Figure 3E:
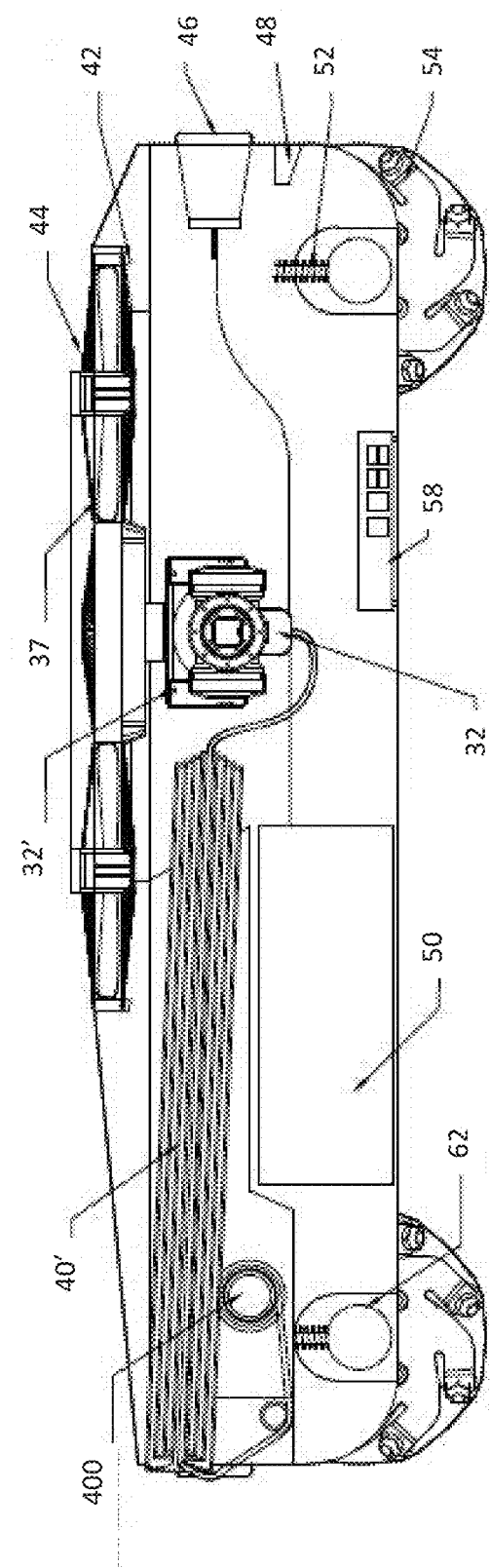
FIG. 3E is a side cutaway view of an alternate embodiment of the robot of FIG. 1-2.

FIG. 3E shows an alternate robot embodiment similar to that FIG. 3A. In FIG. 3E a telescoping arm 40' is provided with a plurality of hollow shafts in concentric arrangement. Through the center of this concentric arrangement of shafts, cable 400 passes and connects to the camera 32. In this case, the arm 40' will pivot from or adjacent one end of the robot (the rear end as shown). The pivot 56 as shown in FIG. 3A can be used at the base of arm 40'. Alternatively, the pivot 43' may be constrained to only allow the arm 40' to pivot about an axis extending out of the page in FIG. 3E.

Figure 3G:
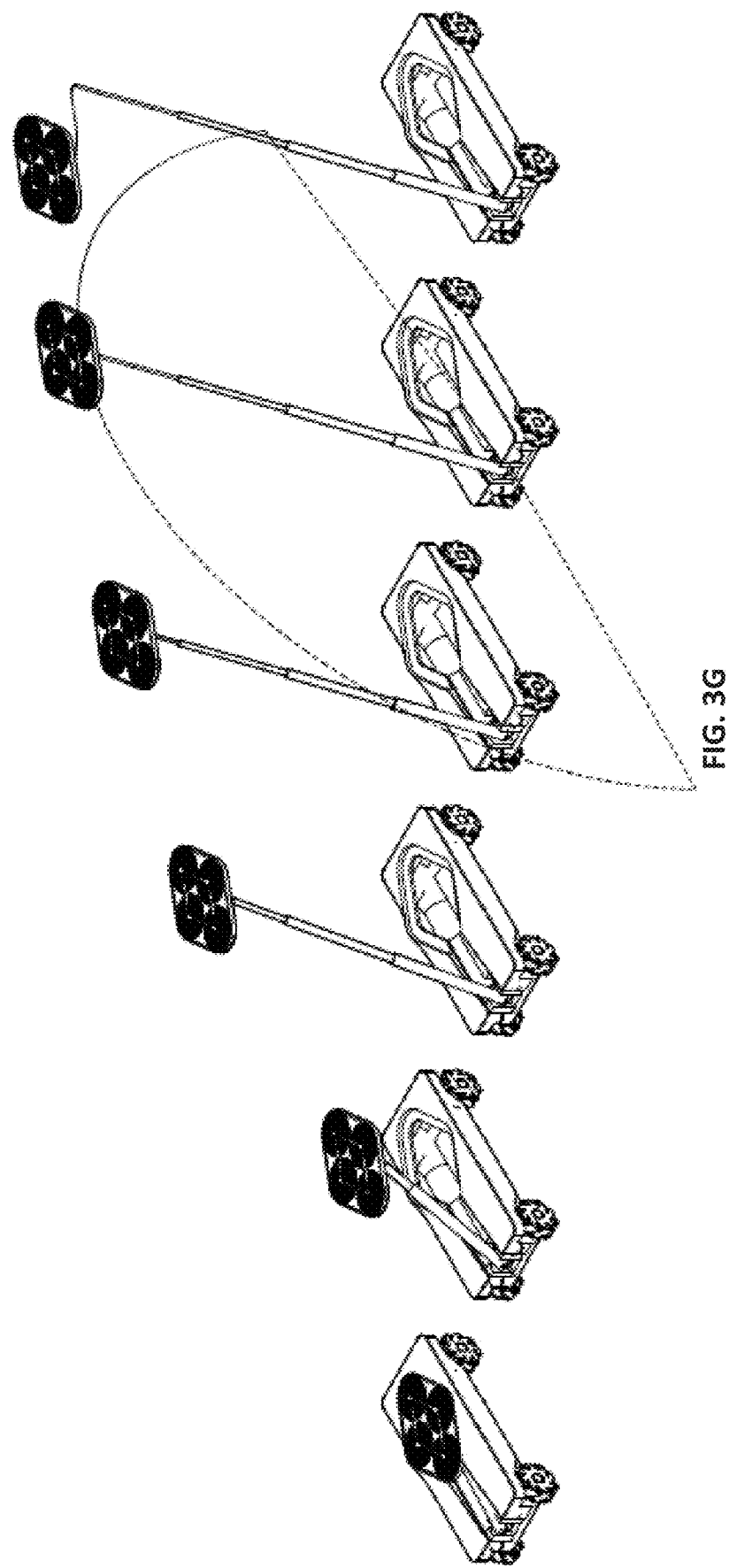
FIG. 3G shows how the UAV portion of the robot of FIG. 3E is deployed.
Figure 3H:
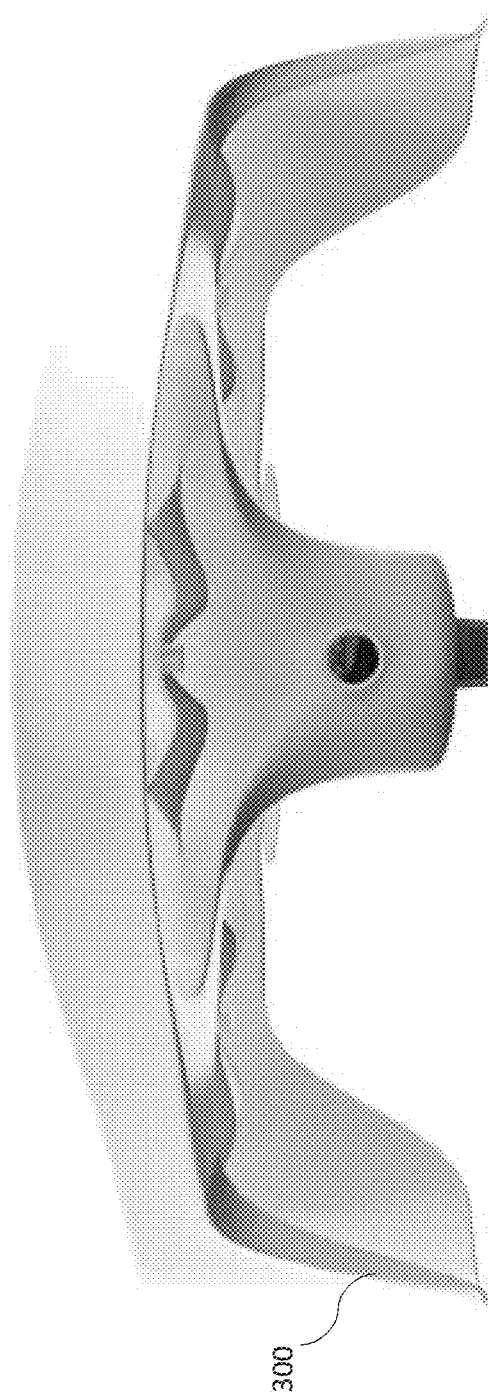
FIG. 3H shows a front view of the UAV but with a hood/shade.

FIG. 3G shows the process of deploying the UAV in that the magnetic registers will allow the UAV to leave its recess/cradle and the UAV will begin to extend upwards. As this occurs, the concentric shafts begin to telescope apart as the UAV extends higher. On the right most drawing in FIG. 3G, the arm 40' is fully extended and the cable 400 is extended longer than this arm 40'. In this manner, the arm stays relatively rigid and will not move left to right but will move forwards/backwards. This is especially useful in capturing a VIN number or photos over the hood/roof etc in that the arm will stay generally in the vertical plane (second from right) which will typically be aligned along the lengthwise axis of the vehicle. The extra cable 400 at the top of the arm 40' then allows the UAV to move outside this plane of the arm 40' and move over e.g. the VIN plate on the car or over the roof or other location. The robot will know the length of the cable as compared to the extension distance of the arm 40' and the height of the UAV over the ground and can therefore know where the cable is so that snags can be avoided. As an example, it would be desirable to avoid the drone cable 400 being caught on a mirror or to avoid the arm 40'/40 from impacting the vehicle and causing damage. Thus, the semi-rigid arm 40'/40 can provide enough rigidity to resist unconstrained and/or unpredictable movement of the cable 400 which could e.g. cause undesirable contact with the vehicle or catch obstructions such as mirrors, spoilers or other vehicle features.

Referring to FIGS. 4 and 5, the process of scanning the VIN 100 begins either through the robot (FIG. 4) or via the mobile application (FIG. 5) described herein. Preferably, this VIN will be scanned and the server checked 102 to verify that the VIN number is an expected VIN number to be at the particular location that the scanning takes place.

Alternately, the server may not be checked when creating a new vehicle record. If the server check 102 fails or other errors occur in scanning the VIN, error resolution 104 occurs. Certain specifics on error resolution 104 are described later in this disclosure. Next, the robot checks for un-captured locations 106 to verify that this VIN number has not been scanned already by another robot (or itself). This can be done by communicating locally with other robots or via communication over a network connection, such as cellular, wifi or the like. The robot also checks the inventory of vehicles it has already scanned to be sure the VIN number has not been previously scanned. However, this process of internal checking can often be skipped in that the robot will know the gps positions of vehicles it has already scanned recently. But, given that the lot is expected to change over cars as they move through the supply chain, GPS position alone may not be enough in that a different car could have been positioned in a location previously scanned. It is also contemplated that as vehicles are moved off the lot where the robot is based, the vehicle record can indicate scanning of the VIN number in a different location such that if only some of the vehicles have been moved, the robot may know which VIN numbers (and their positions) have been replaced with different vehicles. Once the robot has decided that it has scanned a new VIN number the process of capturing images 108 begins. This involves, e.g. driving the robot under the car to take photos of the under-carriage as well as deploying the drone to take photos around the vehicle and specifically of all the panels, bumpers, windows, roof and other features of the vehicle. As these images are taken (or alternately in batches) the images are sent to the server 110 and as images are being taken, the robot also receives image locations captured by other robots working in the area. Thus, in the situation where the cars are parked in the configuration shown in FIG. 3, the robot could take photos of the driver's side (where the VIN plate usually is) and then allow another robot to take the passenger's side photos. Given that the location of the VIN number photo is known and the arrangement of the vehicle is also known (e.g. that the vehicle is pointing north or another heading) from the photos taken along the drivers side, the second robot can then know which VIN number the images of the passengers side correspond to based on the photos being taken at 90 degrees to the vehicle heading and the length and position of the vehicle being known from other photos or from known characteristics of the vehicle such as wheelbase etc based on manufacturer specifications. As these photos are received at the server, the vehicle record is updated 112 (or created as appropriate). The process of the mobile application being used to take vehicle photos is largely similar to the robot for the first few steps. However, the mobile application will display prompts 114 to capture needed vehicle images. This may include directing the user to a different vehicle if it turns out that vehicle has already been scanned. The user will follow the prompts to take images. This may be prompts to take images of specific locations on the vehicle which allows the user some flexibility in how to take the images 118 and relies more on the user framing the photo correctly. In another embodiment this involves aligning the AR target with the target on the screen 116 through a more automated or fixed structure of capturing images 118. Specifics of the AR target and the alignment targets on the screen are described later in this disclosure. As the images are captured, the GPS location(s) are also provided with the photos 118. This may include the specific location of the specific photo or may further associate the photo with the VIN scan location and then know from manufacturer's specifications/measurements where the photo was taken given which prompt was displayed or which target alignment resulted in the image. As these images are taken, or optionally in batches, images are sent to the server 110 and the vehicle record is updated/created 112. Additionally, the location(s) of images will be sent to the server as well and the mobile application can receive image locations of other images already captured by others performing the same/similar image capture process using a different mobile device running the application.

Figures 6A, 6B:
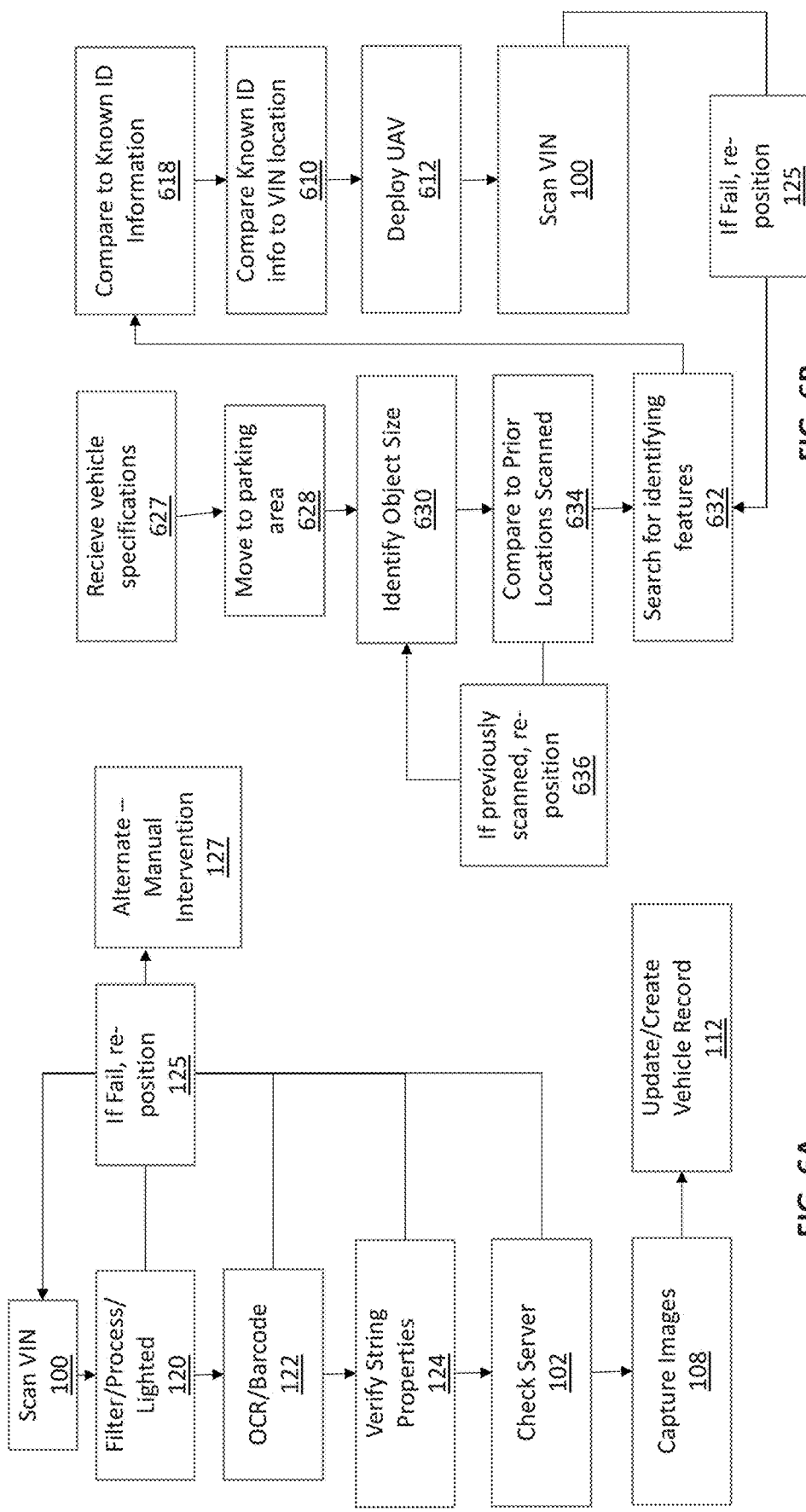

FIG. 6A shows further detail on the VIN scanning process accomplished by the mobile phone software or the robot software. The VIN is scanned 100 by placing the camera close to the drivers side windshield. In this process, the robot will be able to recognize where the VIN is located and the mobile phone user would also know where to find the VIN. The image will be captured and filtered/processed/lighted 120 to get a high quality image. OCR or Barcode or other scanning 122 will occur and then the character string will be recognized and the properties of the string verified 124. For example, VIN numbers often by a sequence of numbers/letters will indicate the make, model, color and other features of the car and if the sequence does not match any expected pattern, it would be known that a problem occurred. As one specific example, if a red car is seen by the camera but the VIN indicates a blue car based on the string properties, a failure 125 would result and the VIN would be re-scanned. As an alternative, manual intervention may be needed 127 which may involve flagging the vehicle/VIN/location for later manual resolution or by sending a message to a user requesting scanning via the mobile application also described herein. Prior to beginning the scanning 100 as shown in FIG. 6A or when re-positioning, the software of the robot will need to utilize the various sensors/cameras to position the robot in a location where the VIN is expected to be. This is detailed in FIG. 6B.

As previously mentioned, the vehicle specifications 27 are used to allow the robot to recognize vehicle identifying features based on a comparison to known vehicle identifying features. FIG. 6B shows the software logic which can be used to position the robot so that the VIN can be scanned 100. The vehicle specifications 27 can be sent to/received at the robot 627 as part of the VIN information 28 or as a separate download/transmission. The robot will move to the parking area 628 which may be area 2 as defined by a geofence. The robot can direct this movement based on GPS coordinates. As this movement occurs, the robot's various cameras and proximity sensors will be activated. The UAV may or may not be deployed. When the cameras/proximity sensors identify objects 130, typically by identifying object sizes. Larger objects would be anticipated to be targets to consider and as the robot moves, it will be able to compare the object location to any prior positions where images have already been captured/scanned 634. This checking 634 may include verifying that the same color/shape cars are in the same expected locations to confirm that the location already scanned still contains the same car. Alternately, if the robot is for the first time scanning vehicles in a particular batch, all vehicles would be known to be targets that need imaging. When an object is identified and chosen based on the camera(s)/proximity sensor(s), the robot will move towards that vehicle while avoiding running into other objects through use of the cameras and sensors. As the robot approaches, it begins looking for known vehicle identifying features 632. This may include search for a bumper, wheels, head/tail lights, windows, windshield or other features of the vehicle. Typically the camera will take a picture and will compare to prior photos of vehicles which can be the known vehicle identifying information 618 and it is also understood that these prior photos can be used to generate shape outlines of various components of vehicles or that comparisons to prior photos of known vehicles can be made as some examples. The known information comparison can also measure dimensions of the vehicle features, such as wheel spacing, width, height etc and then these measurements can be used to narrow down to determine the make/model/year/trim of vehicle that the robot is looking at. Once the vehicle is of a known type based on the comparison 618, the VIN location can therefore be determined. Specifically, this known vehicle identifying information can also include the location of a VIN plate/VIN relative to other identifying features and the robot can use the cameras to triangulate the position of various features to know where the VIN is expected to be visible by locating e.g. the wheels and mirrors and then knowing relative to the wheels/mirrors where the VIN is expected to be available. Thus, a comparison 610 of the known vehicle identifying information/features allows the VIN location for the vehicle to be known/approximated. The robot will deploy the UAV 612 to the VIN location then scan the VIN 100 and re-position if failure occurs 125 by repeating the search for identifying features 632 etc.

The received vehicle specifications 627 may be VIN information 28 and may include vehicle specifications 27 for only those vehicles that the robot is expected to capture images of. For example, if the list of vehicles includes only Nissan (make) Altima (model) vehicles, the specifications for the Nissan Altima would be sent with the VIN information 28 and the robot would search for those known identifying features of the Altima. If the batch of vehicles includes a few different models and/or makes/years/trims, the received specifications 627 would cause the robot to search for those vehicles which are expected to be present based on the batch to be scanned. This can speed up the comparisons and identification of vehicles. The list of vehicles to scan may allow the robot to narrow year, trim or other further identifying characteristics as needed. Alternately, the VIN information 28 can include initially all vehicle specifications for all makes/models/trims/years etc in the system computer storage or updates/syncs with new/revised vehicle specifications 27 in the received specifications 627. These vehicle specifications 27 may be in the form of one or multiple images of the same make/model/year/trim of vehicle along with an indication of where in relation to that/those image(s) the VIN plate was located and a VIN number correctly captured. In some aspects, the vehicle specifications 27 may be determined by the system computer from these one or multiple images or updated based on success in capturing VIN numbers. Furthermore, instances where certain vehicle specifications or known features most quickly lead to correct imaging and capture of VIN numbers, the vehicle specifications 27 can indicate the same to the robot. The vehicle specifications 27 can also indicate known shapes of known identifying features of vehicles. For example, bumper shape, grille shape, mirror spacing, wheelbase, window/windshield size/shape and others. These shapes may be in the form of a path or perimeter outline that can be recognized from photographs of vehicles, typically by the robot/camera identifying large pixel color changes and tracing the outline to create a shape to then compare to known shapes.

As an example, if identifying both the wheels and two mirrors most commonly allows the robot to capture the VIN number correctly, the robot will seek out the identification of wheels and mirrors. The learning process can also be expanded to another level in that if identifying the front headlight will often most easily lead to the identification of wheels/mirrors, the robot can also monitor the camera and images captured for indication of the headlight(s). It is understood that this is but one specific example of how the VIN number can be located and is provided to further illustrate examples of machine learning processes for identifying vehicles and quickly finding and capturing VIN numbers in an autonomous fashion. To recognize a vehicle identifying feature via the camera, the robot and its software can locate edges of features by significant color changes in pixels and then resolving those significant color changes into a line/path. As an example, wheels will often have rims next to black tires and thus the rims can be located based on the large change in pixel color. Then a line is drawn around this pixel change. Depending on the angle of the robot, the robot may move a certain distance and re-compute that line and compare the two to determine a center of the shape. Given that the wheel will be round, the line computed may be elliptical in shape if the camera is looking at the wheel off-center. Thus, moving the robot/camera to re-compute the line and then comparing the two lines can allow the robot to determine where the center is. The second wheel and its center can then be identified and triangulation calculations can be used to determine the wheelbase. Knowing the wheelbase can narrow the selection of possible vehicles to only those within a certain wheelbase. Next, the mirror location or window location or windshield location can be determined from that narrowed selection of possible vehicles in that it would be known for each make/model/trim/year where e.g. the mirror is relative to the wheels and then the robot/camera and software can search for e.g. the mirror in those narrowed selection of locations. This process can continue until enough features of the vehicle are identified to know where the VIN plate and VIN number are expected to be located. The UAV is then moved into position to capture the VIN number.

Turning back to FIG. 6A, the VIN scanning and verification process continues and the structure/properties of the string are verified 124 and the server is checked 102 to verify that the VIN number matches a vehicle record or a list of vehicles in the batch to be scanned. If any of these processes 100, 120, 122, 124, 102 fail 125, the camera will be re-positioned 124 to get a better scan or manual intervention is used 127 if repositioning fails too often. Repositioning 124 may involve adjusting camera position due to sun/glare, deploying a screen or hood to more closely surround the VIN, using flash, moving the UAV portion of the robot to block glare or other adjustments to result in better image capture of the VIN so that the VIN can accurately be read. The shape of the UAV may provide the hood 300 (FIG. 3H) by rotating the drone relative to the VIN. It is understood that the UAV in FIG. 3H could have the gimble mount camera even though a non-gimble version is shown. Once the VIN is accurately captured, image capture 108 and vehicle record update/creation 112 proceeds. If the VIN cannot be scanned, the robot can still take the photos and create a vehicle record, but log an error that would direct a human using the mobile app to go to the specific vehicle and get the VIN number manually, or by opening the door and scanning the bar code inside. The mobile app may direct the user to the vehicle with direction commands and also display the images taken to ensure that the correct VIN number is matched to the photos the robot took. Alternately, the robot may not take photos and the mobile app may be used in the situations where the VIN could not be scanned by the robot.

Figure 7B:
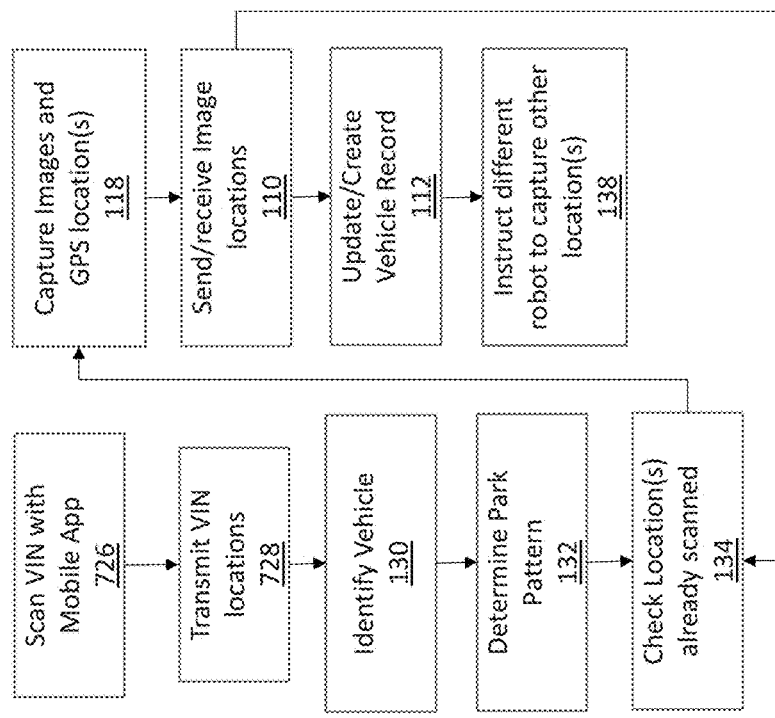
Figure 7A:
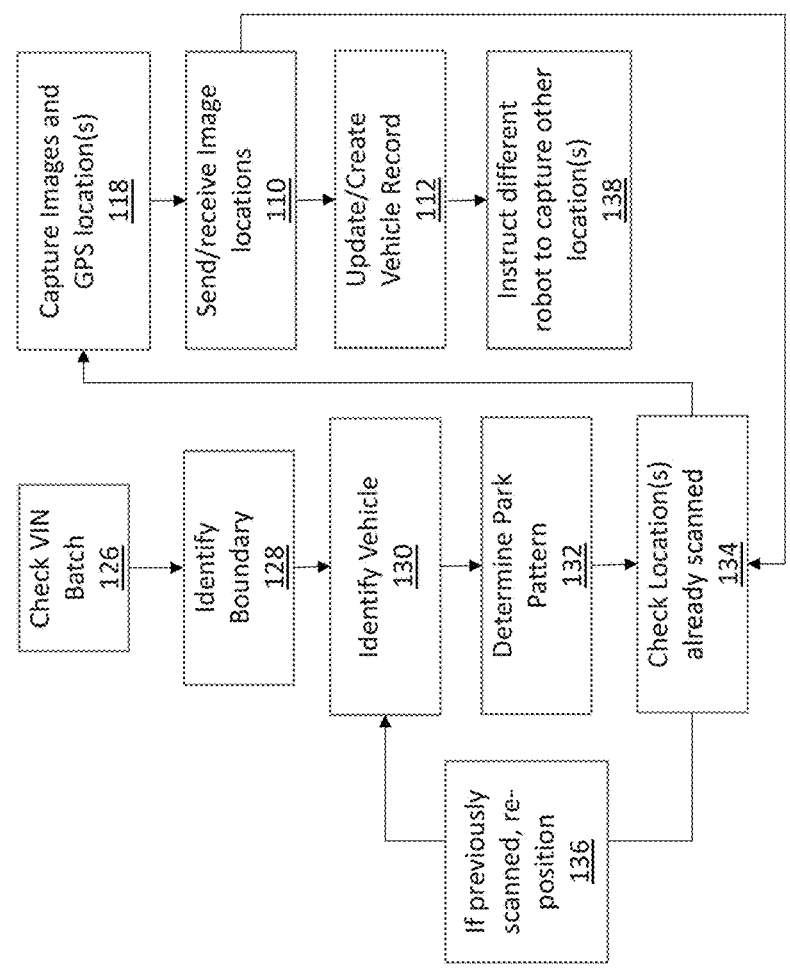

FIG. 7A shows additional details on the process of moving the robot around the lot where batche(s) of vehicles to be imaged are located. Here, a VIN batch 126 will be checked to determine which vehicles have been scanned and their positions. If no vehicles have been scanned, the software will typically determine how many vehicles need to be scanned. The boundary 128 will be identified and typically will indicate the perimeter of the parking lot or part thereof where vehicles need to be scanned. The process of identifying a vehicle 130 will begin by use of the various proximity sensors and cameras on the robot. Features of the vehicle can be identified such as wheels, headlights, mirrors, bumpers, grilles and other recognizable features and as the robot moves towards the vehicles, the park pattern 132 can be determined both in terms of the positioning of the vehicle, (e.g. pointing north or another direction) and the position of vehicles around that vehicle in e.g. a herringbone or grid pattern. As a vehicle 130 is identified, the software checks to determine if the location has already been scanned 134. Previously scanned vehicles 136 result in identifying a new vehicle 130 and repeating the process until it is determined that a new vehicle to take images of is in front of the robot. The robot proceeds to capture images and GPS location(s) of those images 118 or alternately associate those images with one GPS location for the vehicle. The robot then sends image locations 110 to the server and also is receiving image locations from other robots. As image locations are received, this is also used to check for locations already scanned 134. The vehicle record is updated 112 with the images/locations and the robot then moves on to the next location 138 through automated software commands.

FIG. 7B shows how the mobile application and robot may be used together with the mobile application being used to capture VIN numbers and locations and the robot being used to capture images based on those VIN locations. The mobile app will be used to scan VIN numbers 726. As the VIN numbers are scanned, the GPS position is captured based on the GPS receiver/chip in the mobile device. These VIN locations are transmitted to the system computer/server 728 and received by the robot. In this way, the VIN scanning process can scan the exterior VIN plate or if that does not work, scan the barcode on the inside of the door jamb or receive manual input. Thus, a batch of VIN numbers can be scanned and located by a human operating the mobile app and then the robot will take over by identifying the vehicle 130 and determining its position/park pattern 132 and verifying that the vehicle has not yet been scanned 134 by another robot. The images and GPS locations are captured 118, sent received 110 and vehicle records updated/created 112. The robot once it has captured the appropriate images proceeds to be instructed to move to a different location 138—typically associated with a VIN that has been scanned by the mobile app whose location is known based on GPS position. The combined use of the mobile application and the robot has the benefit of human manipulation of the camera position to capture VIN numbers efficiently and if external capture is not possible, the human operator can open the vehicle door and scan the barcode inside the doorjamb. The feature of opening a door and scanning the door jamb would be a feature a robot could be built to do, but it would be overly complex. Thus, the combined use of the robot and mobile device together enables a more streamlined robot design and removal of one of the more complex scanning processes from the robot's tasks—accurately capturing the VIN number.

Figures 8, 9, 10, 11:
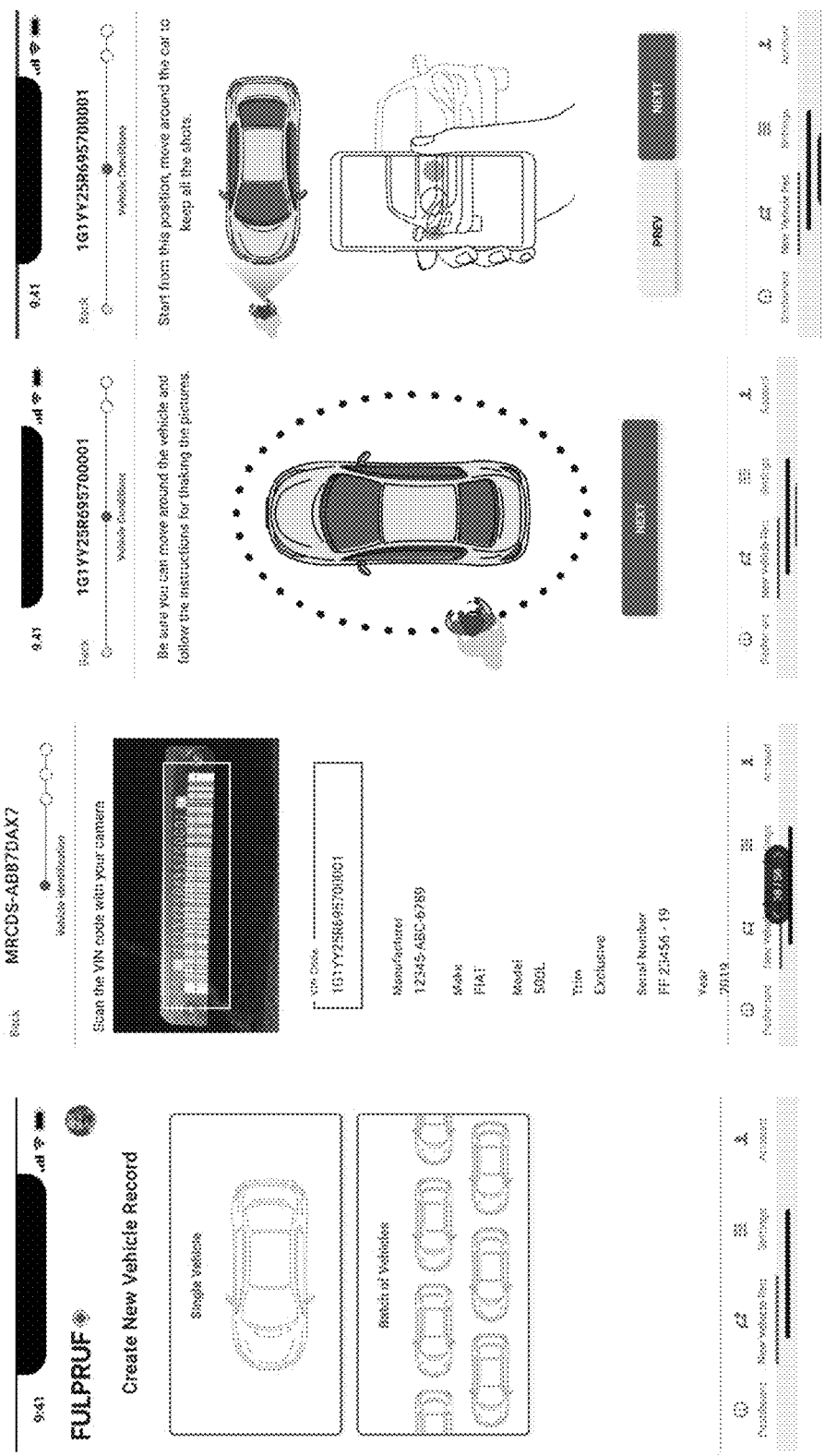

The mobile application based solution as described previously is provided with a software application which executes on a mobile device and is in communication with a server over a network. The application provides a login page for individual users to login and begin scanning vehicles and identifying damage. The user can create a new vehicle record (FIG. 8) or a batch of vehicles and proceed in scanning the VIN (FIG. 9) and the vehicle record is updated. If the same VIN is already scanned, the exiting record is accessed instead. FIG. 9 shows the image capture where the VIN (or barcode) is scanned and then from the VIN number various information such as manufacturer, make, model, trim, serial number, year can be determined either from the VIN string itself or via communicating the VIN over the network to the server where the information shown is stored. The user is then given instructions for scanning the vehicle with an exemplary path (FIG. 10) that should be followed. At various points along the path, partially transparent or shaded circles are provided around the car (FIG. 11) and as can be seen, the mobile device is provided with a ring in the middle which is stationary. The shaded circles are viewed as circles by the mobile device when the camera is correctly positioned. If the angle of the camera relative to the vehicle is not correct, the shaded circles will look more like ellipses (see "circle" to left of ring in FIG. 11). Thus, by centering the shaded circle in the ring and having the shapes generally match and be concentric, the user knows that the correct alignment of the camera to the vehicle has been achieved. Thus, the shaded circles act as targets for the ring shaped alignment target to line up with and capture images. There is also an option to report damage (FIGS. 12/13) by pressing the button displayed on the screen and associate that damage within an image where the ring and the circle are aligned.

The circles (FIG. 11) are shown over an actual car image in FIGS. 13 and 14. The circles are generated in a manner that they are stationary in position on the image relative to the car such that if the user moves closer or farther from the car, the circles will stay in position, but would appear smaller or larger depending on the distance. This distance is judged by a grid overlay which is shown on FIGS. 13 and 15 and generated by the software in order to place the augmented reality circles which are overlaid over the camera captured image. FIG. 13 shows an example how the stationary ring with respect to the phone screen is aligned properly with one of the circles. As can be seen, the circle is within the ring and the relative size of the circle to the ring is within appropriate tolerances to therefore indicate that the user is capturing the correct amount of the car in the frame. If the user is too far or too close, the screen can flash with directions or another indication to direct the user to move closer or farther away as the case may be.

Figure 18:
Figure 17:
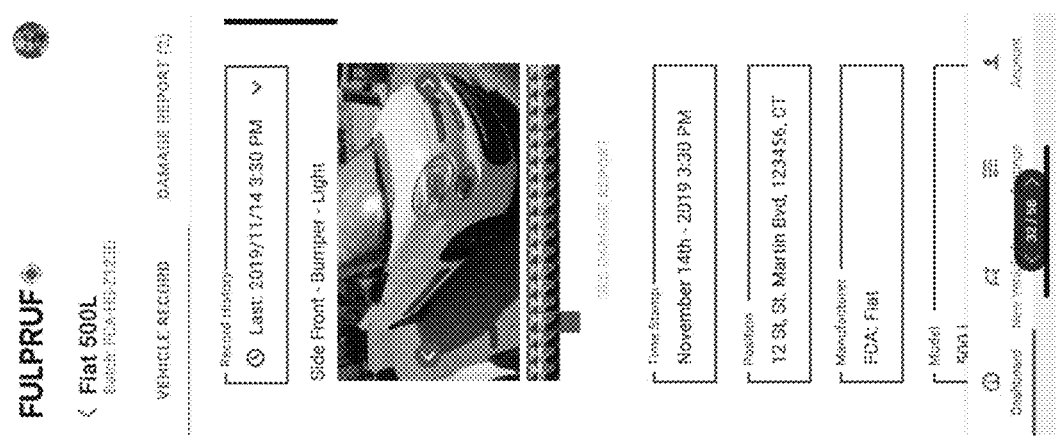
Figure 16:
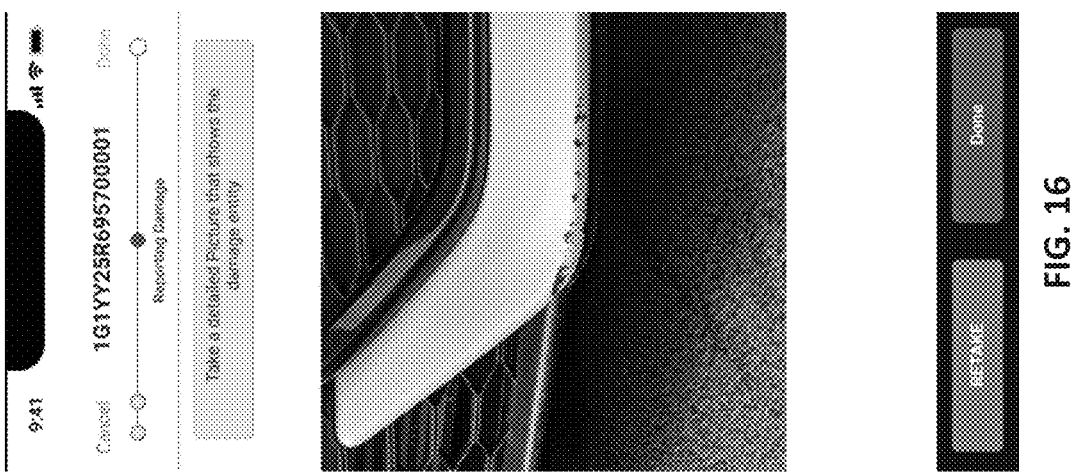

As seen in FIG. 13, the user is provided with a button to click to "report damage" and the type of damage and/or origin can be identified on the next page. The user then continues with the process of tracking around the vehicle and aligning the ring with the circles (FIG. 15). FIG. 16 shows an option to take a detailed damage picture and FIG. 17 shows the end result of the vehicle record creation with a number of photos available to be looked at or chosen to reflect the vehicle's condition. FIG. 18 shows additional options regarding how damage can be located and identified in that a specific circle can be annotated on the photo and the size changed so that damage can quickly be located.

An exemplary process of generating the grid and circles (FIG. 13) is as follows. The user is asked to hold the phone up to the vehicle and a scan is accomplished by the mobile device using the camera, preferably a mobile device with multiple cameras is chosen so that it is possible through triangulation and knowledge of the focal length of the lenses where various elements are relative to the camera. The mobile device then through image recognition identifies elements of the car. For example, mirrors, headlights and the body panels. Specifically, body panels would be expected to be constant colors or of a pre-defined color scheme, the wheels would have a pattern of typically black tires with a metallic rim or hubcap. The VIN may also identify the tire and/or wheel size which can assist in scaling the grid and placing the AR circles. Upon scanning the VIN number, the color may be known to the software such that the software looks for that color in the image to try and identify the car. The AR grid is then generated (FIG. 13) based on the location of the mobile device relative the car. The grid may be visible as shown (FIG. 13) or may not be shown and only calculated. The circles or targets are then placed on the device screen with the ring or alignment target placed in the center. As the user moves around the car, the grid is continuously re-assessed relative to the movement determined and identified via the cameras. As the user walks around the car, the software continues to generate the AR circles/targets and place them since the circles on the right side of the vehicle may not be visible or calculated until the right side of the vehicle is in view. The grid is continuously re-calculated as new portions of the vehicle come into view and the AR circles added. Optionally, the image recognition features of the software can recognize various features of the car which are predictable and in different locations around the car.

It should be understood that the circles and rings are but one optional way alignment and positioning can be controlled and directed by the software. Another option is an AR path which may be e.g. elliptical or oval (from the top view of the car similar to shape of FIG. 10) can be generated with the user directed to hold the line within a certain tolerance by guides on screen. It is understood that upon alignment of the shapes, the user may be directed to briefly pause while an image is captured or that the system may take video and later parse the images into individual shots which are desired around the car. The number of circles or imaging points can vary depending on the size of the car with a large suv having more alignment points than e.g. a compact two door car. Thus, scanning the VIN can indicate to the software how many alignment points or imaging locations need to be generated. Referring to FIG. 14, the user can annotate photos with damage from various drop down menu categories. FIG. 16 shows the option to take more detailed damage photos as needed. FIG. 18 shows the ability to annotate the image with the specific location of damage.

FIG. 17 shows an example batch status screenshot which allows the user to determine the inspection status and drill down further to view specific batches. If the batch is selected, the images and damage records can be viewed. If damage is found, the vehicle handler is also known and as the car moves through the various stages, additional vehicle handlers are associated with different image sets. Thus, when the damage first appears on the images, it is then known which vehicle handler would be responsible. FIG. 17 shows a particular batch drilled down by VIN number and shows the vehicle record which again can further be drilled down to select and view images taken over the course of the shipping cycle in order to pinpoint where and when damage occurred.

Figure 19:
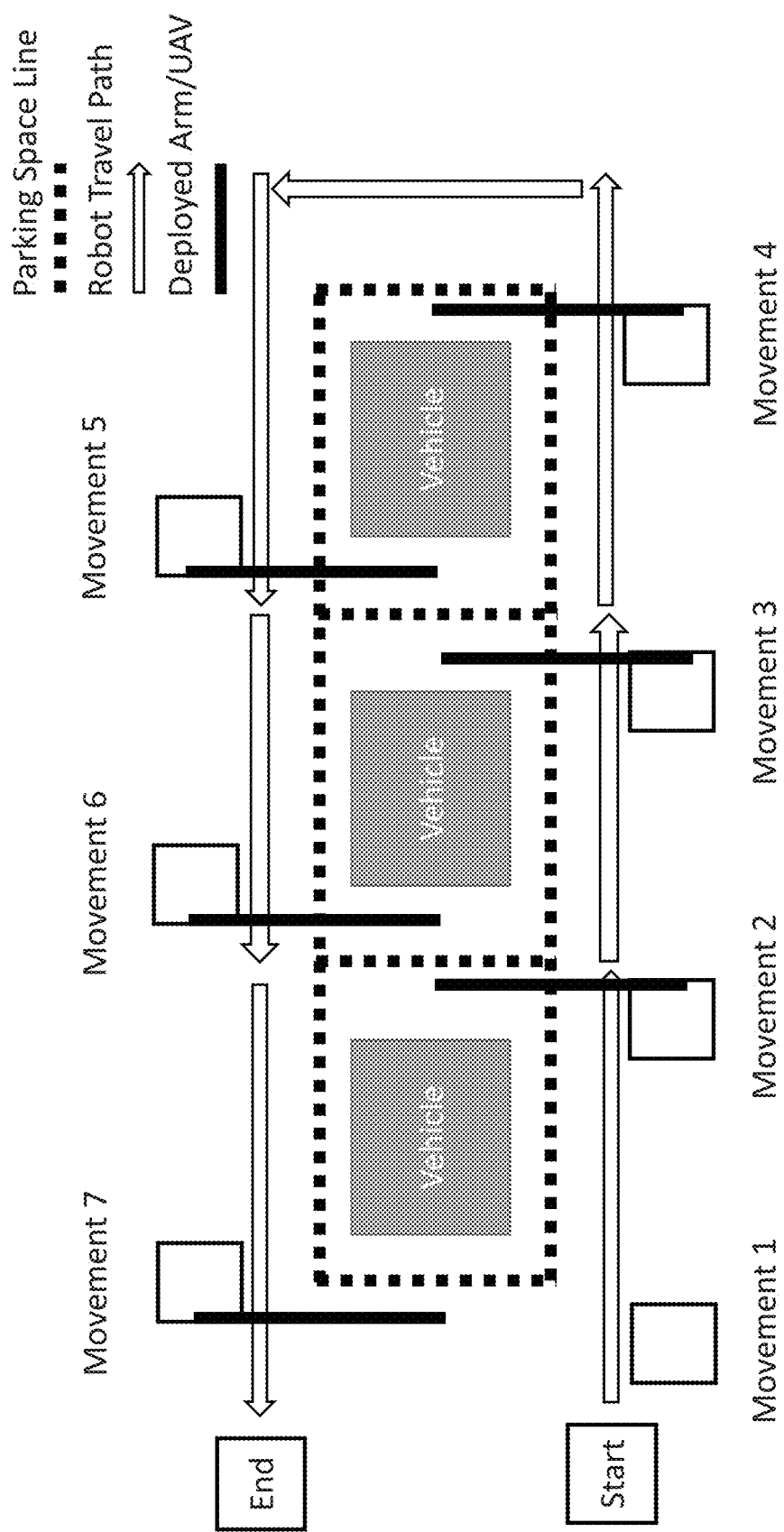
FIG. 19 shows movement and deployment of the UAV component of the robot in FIGS. 3A-C.

As has been described previously, the robotic solution involves a specially designed robotic device which can travel in the narrow spaces between vehicles, which in the situation of the largest vehicles may only be 14 inches between mirrors. FIG. 19 shows side and rear views of an exemplary robotic element specifically adapted to capture images of vehicles on large staging lots. Namely, the base is less than 14 inches deep, preferably less than 12 inches and more preferably 12-8 inches and most preferably about 10 inches deep such that the vehicle can travel along the 14 inch corridor. The base is longer than it is wide by a factor of at least 1.5×, preferably the base is at least 18" long, more preferably at least 20" and even more preferably in the 22-30 inch range. The embodiment shown is 24" long. This length and the spacing of the wheels being relatively close to the base length provides stability given that an arm/UAV maximum height longer than the base by a factor of at least 1.5× is also provided. A wider base may provide added stability.

The camera (as well as other locations on the robot) can also be fitted with laser, radar or other sensors so that the robot can avoid running into adjacent vehicles. The robot is also fitted with optical, laser or other sensors which look downwardly to find a painted parking space line (typically yellow or white in color). This line can be used to allow the robot to maneuver in the appropriate locations to sense vehicles.

The robot can also have GPS hardware and processing capabilities to track and keep track of its position and path to ensure that all vehicles are scanned as well as cellular and wifi communications capability. The robot can also include lighting and/or flashes to compensate for different environmental lighting conditions. The robot is preferably powered by battery and may optionally include solar panels to charge the battery or otherwise power the robot.

Figure 20:
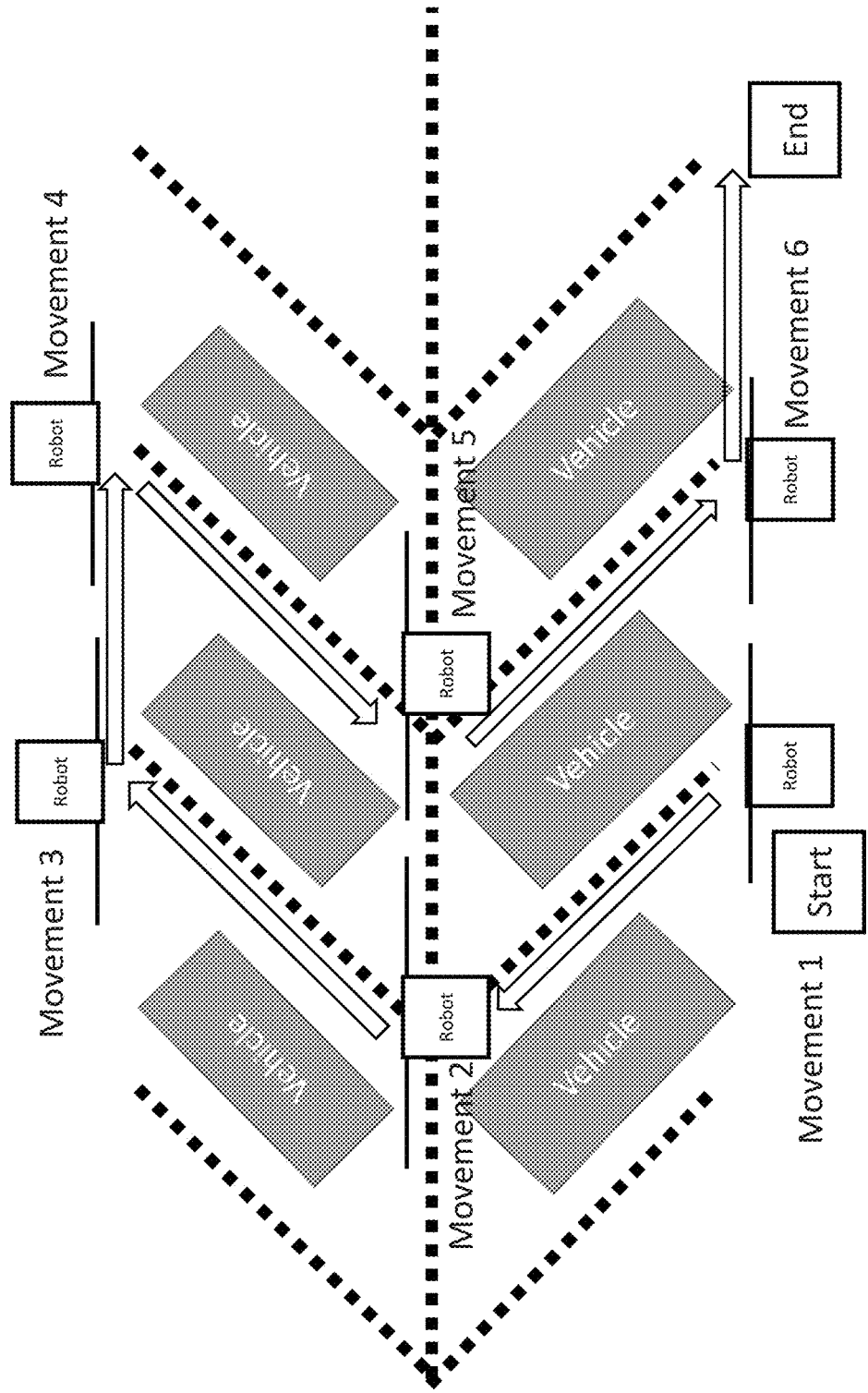
FIG. 20 shows movement and deployment of the UAV and robot in a different parking lot configuration.

The onboard computer on the robot connects to the various sensors and will guide the robot along the spaces between vehicles as shown in FIGS. 19-20. In the straight parking space layout with the example three vehicles shown, the start in position and can rotate and position the camera at the appropriate height to capture the side of the vehicle. At one side of the vehicle, the arm is deployed into the nose/tail space and the camera is rotated to capture the first and second vehicles in the path. The positioning of the arm will include scanning the VIN tag so that the images can be associated with particular vehicles. The computer is programmed to direct the robot around the vehicles and continue to stop, deploy the arm and take images as needed. Although three cars are shown, it is understood that the line of cars scanned can be much longer.

The herringbone style scanning is depicted on FIG. 20 and includes similar operations by the robot, but along a different pathway with the UAV being deployed as and where needed to capture images of the vehicle. It is understood that although straight lines have been shown to represent the UAV deployment, one of skill in the art would appreciate that the combination of the flexible tether and the UAV's ability to move in various directions could involve the UAV flying itself to specific locations to capture desired image views of the vehicle.

When the images are transmitted to the server over the cellular or wifi or other network connection, those images are inspected by the server software and through use of image recognition, cosmetic defects and damage can be identified and flagged. The flagged damage can be provided for human review to verify there actually is damage or not and the image recognition system can then use a learning algorithm to better identify damage. These damage tags are added to the vehicle record at different images and ultimately when the recipient of the vehicle (e.g. a dealer) does their inspection, they can be given a spec sheet where they can visually inspect the locations where damage or defects have been identified and then determine if the damage in fact occurred and then submit a claim for the different damages. The claim can then be specified for each damage identified so that the appropriate responsible party receives a claim for the damage which they are responsible for paying based on where and when the images which first identified the damage were taken. The insurance companies who pay for the damage then have a reliable record and can provide for increased efficiency in their claims resolution process and reduce the number of improper or fraudulent claims for damage.

In either situation with the mobile application or robotic implementation, the relevant vehicles are imaged each time they are at a staging lot or are otherwise delivered to a different responsible party during the course of vehicle transport from factory to show room. In each location where the vehicles are scanned, the images are time stamped and location stamped so that it is known where each image was taken and therefore which party was responsible for the vehicle at that time. As VIN numbers are scanned in different locations, the vehicle record is updated with additional images and optionally damage tags to identify damage.

FIGS. 21-22 show example vehicle records and their status which can then be selected and drilled down further to see VIN specific details. For example, by clicking on/selecting one of the records the information shown in e.g. FIG. 17 can be viewed along with other information in the vehicle record.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for image capture of vehicles comprising:
a mobile computing device having a camera, a display and mobile software executing thereon, the mobile software configured to receive a vehicle identifier for at least a first vehicle;
the mobile software configured to display one or more prompts, the prompts include at least one target displayed on the screen, the at least one target positioned and sized on the screen based on the mobile software identifying the first vehicle via the camera and determining a position of the camera relative to the vehicle and based on at least one pre-determined view of the first vehicle and the target moves on the display upon movement of the mobile device around to the vehicle;
wherein upon alignment of the at least one target with the display according to the at least one pre-determined view, the mobile software captures at least one image of the vehicle with the camera for each of the at least one target.

2. The system of claim 1 wherein the mobile software captures a plurality of images, each image associated with one of the plurality of targets.

3. The system of claim 1 wherein the mobile software transmits the at least one image over a network to a system computer where a vehicle record associated with the vehicle identifier is associated with the at least one image.

4. The system of claim 2 wherein each of the at least one images is associated with a location as determined by a GPS receiver of the mobile computing device.

5. The system of claim 1 wherein the mobile software displays one or more prompts for capture of a vehicle identification (VIN) number via the camera.

6. The system of claim 2 wherein the mobile computing device comprises a plurality of mobile computing devices and wherein a system computer is configured to receive first and second sets of images from different ones of the plurality of mobile computing devices and to associate the first and second sets of images with the same vehicle record based on a vehicle identification (VIN) number.

7. The system of claim 5 wherein the first and second sets of images are associated with different locations indicative of the same vehicle having been at two different locations.

8. The system of claim 6 wherein each of the plurality of mobile devices is associated with a GPS receiver and the two different locations are determined based on the GPS receiver.

9. The system of claim 7 wherein the first and second sets of images are a plurality of first sets of images and a plurality of second sets of images, each set of the plurality of first sets of images associated with a different vehicle identifier and vehicle record.

10. The system of claim 1 wherein determining a position of the camera relative to the vehicle includes identifying at least two points on the vehicle and determining a distance and angle of the camera relative to the vehicle.

11. A system for vehicle supply chain tracking through image capture of vehicles comprising:
a system computer having software executing thereon, said system computer in communication with one or more mobile devices and one or more robots via one or more networks, each mobile device and each robot including a camera and a global positioning system (GPS) receiver:
said software configured to receive a plurality of vehicle identifiers from the one or more mobile devices each vehicle identifier associated with a GPS location determined by the GPS receiver of the one or more mobile devices;
said software configured to transmit instructions to the one or more robots to direct at least one of the one or more robots to each of a plurality of the GPS locations such that the at least one of the one or more robots moves to or adjacent to the GPS location and captures a plurality of images of a vehicle associated with the vehicle identifier at or adjacent its corresponding GPS location.

12. The system of claim 11 wherein the robot includes with a ground movement device configured to move the robot over a ground surface.

13. The system of claim 12 wherein the robot further includes at least one thruster configured to move a portion of the robot through air.

14. The system of claim 11 wherein a portal is provided with said software of said system computer to allow access to a vehicle record and the vehicle record includes the plurality of images captured by the one or more robots.

15. The system of claim 1 wherein the plurality vehicle identifiers are captured by scanning using barcode scanning or ocular character recognition.

16. The system of claim 15 wherein the vehicle identifier captured is verified based on a string of letters and/or numbers determined by the scanning and checking if the string matches an expected vehicle identifier pattern and if scanning fails or the string does not match, the software of the corresponding mobile device generates instructions to re-position the camera.

17. The system of claim 11 wherein one or more of the plurality of vehicle identifiers is a vehicle identification (VIN) number.

18. The system of claim 11 wherein one or more of the plurality of vehicle identifiers is obtained using the camera of at least one of the one or more mobile devices.

* * * * *